US012013243B2

(12) United States Patent
Johnson et al.

(10) Patent No.: US 12,013,243 B2
(45) Date of Patent: Jun. 18, 2024

(54) PASSAGE PLANNING AND NAVIGATION SYSTEMS AND METHODS

(71) Applicant: FLIR Belgium BVBA, Meer (BE)

(72) Inventors: Mark Johnson, Vannes (FR); William M. Sayer, Hampshire (GB); Mark Rivers, Winchester (GB); Brian L. Jensen, Madison, WI (US); Marcel Tremblay, Goleta, CA (US); Christopher D. Gatland, Fareham (GB)

(73) Assignee: FLIR Belgium BVBA, Meer (BE)

( * ) Notice: Subject to any disclaimer, the term of this patent is extended or adjusted under 35 U.S.C. 154(b) by 228 days.

(21) Appl. No.: 17/601,041

(22) PCT Filed: Apr. 3, 2020

(86) PCT No.: PCT/US2020/026752
§ 371 (c)(1),
(2) Date: Oct. 1, 2021

(87) PCT Pub. No.: WO2020/206380
PCT Pub. Date: Oct. 8, 2020

(65) Prior Publication Data
US 2022/0214171 A1    Jul. 7, 2022

Related U.S. Application Data

(60) Provisional application No. 62/830,237, filed on Apr. 5, 2019, provisional application No. 62/830,259, filed on Apr. 5, 2019.

(51) Int. Cl.
*G01C 21/20* (2006.01)
*B60L 50/60* (2019.01)
(Continued)

(52) U.S. Cl.
CPC ............ *G01C 21/203* (2013.01); *B60L 50/60* (2019.02); *B60L 58/12* (2019.02); *B63B 49/00* (2013.01);
(Continued)

(58) Field of Classification Search
CPC ....... G01C 21/203; B60L 50/60; B60L 58/12; B60L 8/003; B60L 15/2045;
(Continued)

(56) References Cited

U.S. PATENT DOCUMENTS 4,352,063 A    9/1982  Jones et al.
7,047,114 B1   5/2006  Rogers
(Continued)

FOREIGN PATENT DOCUMENTS

CN        102072753 A      5/2011
DE     102006001007 A1     7/2007
(Continued)

OTHER PUBLICATIONS

Statheros et al., "Autonomous Ship Collision Avoidance Navigation Concepts", Technologies and Techniques; Dec. 10, 2007, pp. 129-142, vol. 61, Issue 1, Cambridge University Press, Cambridge, United Kingdom, Abstract.
(Continued)

*Primary Examiner* — Hunter B Lonsberry
*Assistant Examiner* — Harrison Heflin
(74) *Attorney, Agent, or Firm* — Haynes and Boone, LLP

(57) ABSTRACT

Techniques are disclosed for systems and methods to provide passage planning for a mobile structure. A passage planning system includes a logic device configured to communicate with a user interface associated with the mobile structure and at least one operational state sensor mounted to or within the mobile structure. The logic device determines an operational range map based, at least in part, on an
(Continued)

operational state of the mobile structure, potential navigational hazards, and/or environmental conditions associated with the mobile structure. Such operational range map and other control signals may be displayed to a user and/or used to generate a planned route and/or adjust a steering actuator, a propulsion system thrust, and/or other operational systems of the mobile structure.

20 Claims, 19 Drawing Sheets

(51) Int. Cl.
  *B60L 58/12* (2019.01)
  *B63B 49/00* (2006.01)
  *B63B 79/40* (2020.01)
  *B60L 8/00* (2006.01)
  *B60L 15/20* (2006.01)

(52) U.S. Cl.
  CPC .............. *B63B 79/40* (2020.01); *B60L 8/003* (2013.01); *B60L 15/2045* (2013.01); *B60L 2200/32* (2013.01); *B60L 2240/12* (2013.01); *B60L 2240/62* (2013.01); *B60L 2240/66* (2013.01); *B60L 2250/10* (2013.01); *B60L 2250/16* (2013.01); *B60L 2260/52* (2013.01); *B60L 2260/54* (2013.01)

(58) Field of Classification Search
  CPC ............ B60L 2200/32; B60L 2240/12; B60L 2240/62; B60L 2240/66; B60L 2250/10; B60L 2250/16; B60L 2260/52; B60L 2260/54; B63B 49/00; B63B 79/40
  See application file for complete search history.

(56) References Cited

U.S. PATENT DOCUMENTS

| | | |
|---|---|---|
| 7,305,928 B2 | 12/2007 | Bradley et al. |
| 7,727,036 B1 | 6/2010 | Poorman et al. |
| 10,095,232 B1 | 10/2018 | Arbuckle et al. |
| 10,324,468 B2 | 6/2019 | Arbuckle et al. |
| 10,671,073 B2 | 6/2020 | Arbuckle et al. |
| 2002/0135230 A1* | 9/2002 | Curtin, Jr. ........... B60R 16/0232 307/10.1 |
| 2007/0089660 A1 | 4/2007 | Bradley et al. |
| 2007/0152626 A1 | 7/2007 | Boebel |
| 2009/0048726 A1 | 2/2009 | Lofall |
| 2010/0138098 A1 | 6/2010 | Takahara et al. |
| 2011/0112710 A1 | 5/2011 | Meyer-Ebeling et al. |
| 2013/0297104 A1 | 11/2013 | Tyers et al. |
| 2014/0106631 A1 | 4/2014 | Ito |
| 2014/0163877 A1* | 6/2014 | Kiyama ............ G01C 21/3469 701/533 |
| 2014/0207363 A1 | 7/2014 | Kanno et al. |
| 2016/0303979 A1 | 10/2016 | Heyse |
| 2016/0332569 A1* | 11/2016 | Ishida .................. B60W 50/16 |
| 2017/0227639 A1* | 8/2017 | Stokes ................. G01S 7/6272 |
| 2018/0107210 A1* | 4/2018 | Harnett ............... G05D 1/0038 |
| 2019/0011266 A1* | 1/2019 | Steward ................. B63B 79/30 |
| 2019/0103026 A1* | 4/2019 | Liu ........................ G06V 10/25 |
| 2019/0361457 A1 | 11/2019 | Johnson et al. |
| 2020/0148203 A1* | 5/2020 | Taniguchi ................. G06T 1/00 |
| 2020/0370906 A1* | 11/2020 | Hayakawa ............ G09B 29/10 |
| 2021/0139123 A1* | 5/2021 | Osara ..................... B63H 25/42 |
| 2021/0239832 A1* | 8/2021 | Calagaz ................. G06Q 50/02 |

FOREIGN PATENT DOCUMENTS

| | | | |
|---|---|---|---|
| DE | 102011116115 A1 | 4/2013 | |
| EP | 1806281 A1 | 7/2007 | |
| EP | 2544161 B1 * | 12/2014 | .............. B60R 1/00 |
| KR | 100404428 B1 | 2/2000 | |
| KR | 100352346 B1 | 3/2002 | |
| WO | WO 2008114955 A1 | 9/2008 | |
| WO | WO-2019086086 A1 * | 5/2019 | .............. B63H 3/10 |

OTHER PUBLICATIONS

Guedes Soares et al "Intelligent guidance in collision avoidance of maritime transportation", Thesis, Maritime Engineering and Technology, Dec. 2012, pp. 9-17, 1$^{st}$ edition, CRC Press, Boca Raton, Florida, United States of America.

Li et al, "Simulation on Vessel Intelligent Collision Avoidance Based on Artificial Fish Swarm Algorithm", Polish Maritime Research Special Issue, Nov. 2016, pp. 138-143, vol. 23, Navigation College, Daltan, China.

\* cited by examiner

822

```
function BoatSpeed_kts = ApparentPolar(aws_kts, awa_deg)
% function to return the predicted sailing speed as a function of appt wind
% employs a true wind polar, where the polar inputs are converted
% to apparent, which creates a scattered set of speed/angle values that
% are interpolated at the point specified in the input
coder.extrinsic('griddata');
TWS_Kts = [4, 6, 10];
TWA_Deg = [0, 20, 32, 36, 40, 45, 52, 60, 70, 80, 100, 120, 140, 150, 160,
180]';
PredictedBoatSpeed_Kts = [
    0.0, 0.0, 0.0    %0
    1.0, 1.8, 2.5    %20
    2.3, 3.5, 4.6    %32
    2.6, 3.5, 5.8    %36
    2.9, 4.4, 6.2    %40
    3.2, 4.8, 6.4    %45
    3.4, 5.2, 6.8    %52
    3.8, 5.4, 7.1    %60
    4.2, 5.6, 7.2    %70
    4.2, 5.7, 7.3    %80
    4.3, 5.9, 7.6    %100
    4.0, 5.6, 7.4    %120
    3.2, 4.7, 6.8    %140
    2.8, 4.2, 6.3    %150
    2.3, 3.5, 5.8    %160
    2.0, 3.0, 5.0   ];%180
```

1002

1004

```
% create lateral and ahead components of true wind corresponding to each
% predicted boat speed
TrueWindCart = cat(3,sind(TWA_Deg)*TWS_Kts, cosd(TWA_Deg)*TWS_Kts);
ApptWindCart = TrueWindCart + cat(3,zeros(size(PredictedBoatSpeed_Kts)),
PredictedBoatSpeed_Kts);
ApptWindSpd_kts = sqrt(sum(ApptWindCart.^2,3));
ApptWindAng_deg = atan2d(ApptWindCart(:,:,1),ApptWindCart(:,:,2));
BoatSpeed_kts = griddata(ApptWindSpd_kts(:), ApptWindAng_deg(:),
PredictedBoatSpeed_Kts(:), aws_kts, abs(awa_kts));
```

FIG. 10

PASSAGE PLANNING AND NAVIGATION SYSTEMS AND METHODS

CROSS-REFERENCE TO RELATED APPLICATIONS

This patent application is a U.S. National Stage Patent Application under 35 U.S.C. 371 of International Patent Application No. PCT/US2020/026752, filed Apr. 3, 2020 and entitled "PASSAGE PLANNING AND NAVIGATION SYSTEMS AND METHODS," which claims priority to the benefit of U.S. Provisional Patent Application No. 62/830,237 filed Apr. 5, 2019 and entitled "PASSAGE PLANNING SYSTEMS AND METHODS," and U.S. Provisional Patent Application No. 62/830,259 filed Apr. 5, 2019 and entitled "PASSAGE NAVIGATION SYSTEMS AND METHODS," all of which are incorporated herein by reference in their entirety.

TECHNICAL FIELD

One or more embodiments of the invention relate generally to passage planning and more particularly, for example, to systems and methods for substantially automated and environmentally compensated passage planning for mobile structures.

BACKGROUND

Some contemporary mobile structures, particularly vehicles with electrical propulsion systems, have limited ranges and difficulties associated with recharging their propulsion systems in areas outside their home berth. Range projection for such mobile structures can be dependent upon a wide array of different factors, including charge levels, environmental conditions (e.g., wind, current, sea state), desired traversal speed, availability of solar charging current, backup generator capacity, and/or other factors. Planning a passage or route for such mobile structures can be difficult, and inaccurate planning can result in unsafe situations and can convert such mobile structure into a navigational hazard for others. Thus, there is a need for a methodology that can accurately and reliably provide range projection for such mobile structures both when planning a passage or route and while traversing such planned route.

SUMMARY

Techniques are disclosed for systems and methods to provide passage planning for a mobile structure. In accordance with one or more embodiments, a passage planning system may include a logic device, a memory, one or more sensors, one or more actuators/controllers, and modules to interface with users, sensors, actuators, and/or other modules of a mobile structure. The logic device may be configured to determine an operational range map based, at least in part, on an operational state of the mobile structure and/or environmental conditions associated with the mobile structure. Such operational range map and other control signals may be displayed to a user and/or used to adjust a steering actuator, a propulsion system thrust, and/or other operational systems of the mobile structure.

In various embodiments, a passage planning system may include a user interface associated with a mobile structure and a logic device configured to communicate with the user interface and at least one operational state sensor mounted to or within the mobile structure. The user interface may include a display, and the logic device may be configured to determine an operational state of the mobile structure based, at least in part, on operational state data provided by the at least one operational state sensor; determine environmental conditions associated with the mobile structure; and determine an operational range map associated with the mobile structure based, at least in part, on the operational state of the mobile structure and the environmental conditions associated with the mobile structure.

In some embodiments, a method to provide passage planning for a mobile structure may include determining an operational state of a mobile structure based, at least in part, on operational state data provided by at least one operational state sensor mounted to or within the mobile structure; determining environmental conditions associated with the mobile structure; and determining an operational range map associated with the mobile structure based, at least in part, on the operational state of the mobile structure and the environmental conditions associated with the mobile structure.

In other embodiments, a passage planning system may include a logic device configured to communicate with a ranging sensor system mounted to a mobile structure. The logic device may be configured to aggregate ranging sensor data provided by the ranging sensor system into a passage database; determine a set of potential navigation hazard contacts based, at least in part, on the passage database; and determine a set of hazard priorities corresponding to the set of potential navigation hazard contacts based, at least in part, on the passage database.

In some embodiments, a method to provide passage planning for a mobile structure may include aggregating ranging sensor data provided by a ranging sensor system mounted to a mobile structure into a passage database; determining a set of potential navigation hazard contacts based, at least in part, on the passage database; and determining a set of hazard priorities corresponding to the set of potential navigation hazard contacts based, at least in part, on the passage database.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 7-10 illustrate flow diagrams of control loops to provide passage planning in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
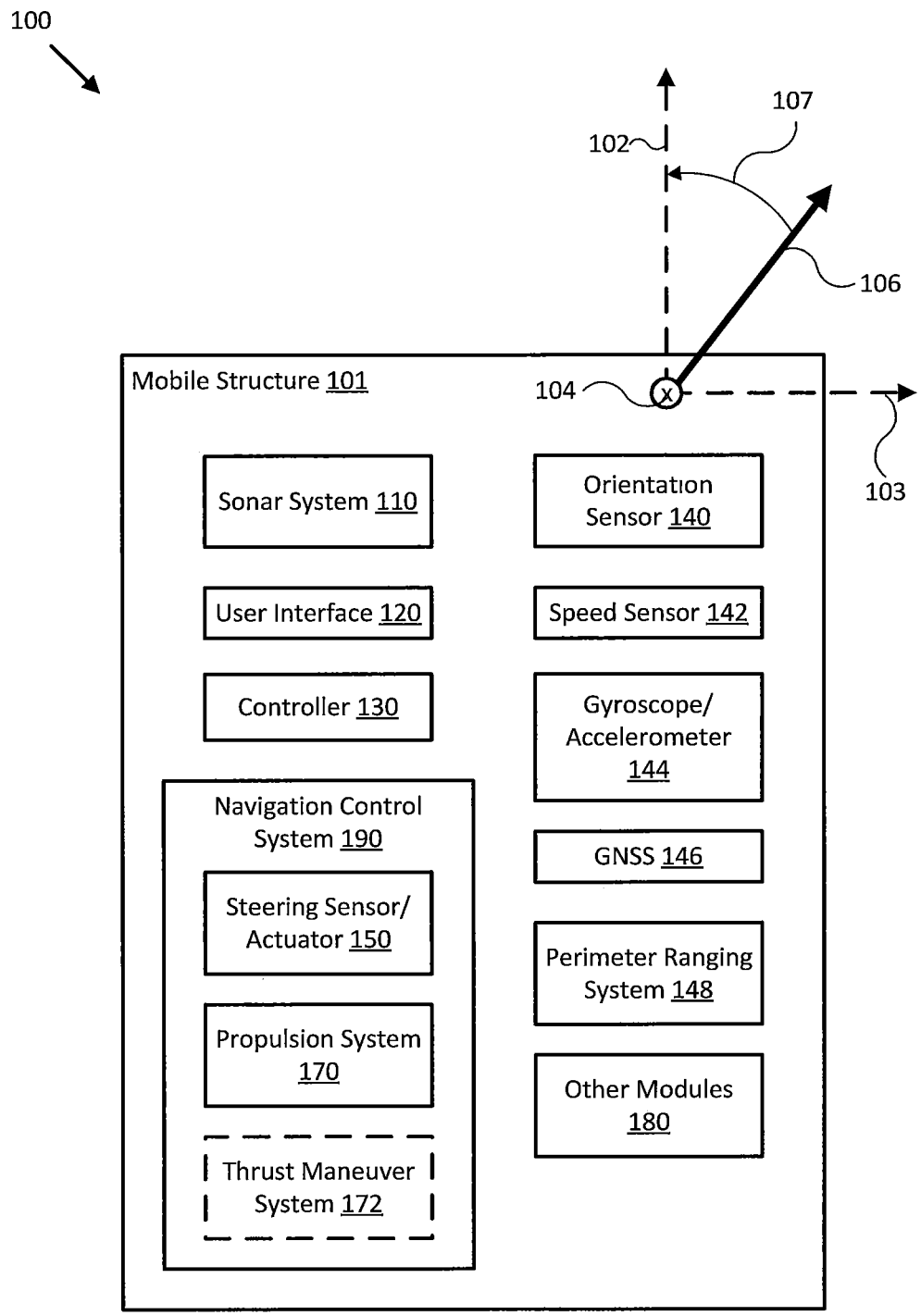
FIG. 1A illustrates a block diagram of a mobile structure including a passage planning system in accordance with an embodiment of the disclosure.

In accordance with various embodiments of the present disclosure, passage planning systems and methods may provide techniques for accurate and reliable range estimation and/or optimization for mobile structures, for example, to help navigate to a desired or safe destination within a safety margin (e.g., of fuel or battery storage) associated with the mobile structure and/or selected by a pilot of the mobile structure. When vessels have limited range (e.g., electric or electric assisted watercraft), the achievable range may be dependent upon many different and interrelated factors, such as battery storage, water current, wind, vessel speed, sea state, solar generating capability, gasoline generating capability, accessory power use, and/or other factors. Selecting a strategy to safely and reliably arrive at a destination can be a complex problem, and embodiments of system 100 may be configured to help users/pilots with passage planning and navigation according to a desired operational use of resources, as described herein.

In particular, for electric or electric assisted watercraft, such as a sailboat with backup electric propulsion, determining the safe range of possible travel can be very complex. For example, a sailboat travelling across 4 knots of wind may be able to make 2 knots under sail power alone, 6 knots under full 5 kW electric motor power, or 5 knots under sail by applying 750 W of electric motor power. In various embodiments, the electric motor can provide a 'gearing' effect where a small amount of electric power provides enough motive force to adjust the apparent wind to allow the sails to work more efficiently. For such assisted sailing or e-sailing system coupled with 10 kWh of storage, the achievable range can be transformed from approximately 12 Nm (e.g., using electric motor power alone) to 66 Nm by leveraging both electric and sail power while the electric power is available.

Other factors affecting range are wind direction and speed, water current, sea state, the effects of sea state on a particular vessel, desired residual battery charge, generating capacity such as solar (photovoltaic) panels or gas generator, accessory (e.g., cooler, navigation, ranging) usage, minimum speed limits and/or other traversal requirements (e.g., through shipping lanes), and/or other factors. For a pilot wanting to select a port of arrival and plan a reliable passage, there are typically too many factors to consider while attempting to navigate through traffic to a docking position. Thus, embodiments provide a graphical chart overlay or map to provide visualization of such operational range of a mobile structure that takes into account these factors and provides a reliable estimation of range, as described herein. Moreover, embodiments can use such operation range maps both to help plan a passage to a destination and to autopilot the mobile structure through such planned passage or route safely.

FIG. 1A illustrates a block diagram of a passage planning system 100 in accordance with an embodiment of the disclosure. In various embodiments, system 100 may be adapted to provide STM sensor calibration for a particular mobile structure 101. In some embodiments, system 100 may be adapted to measure an orientation, a position, and/or a velocity of mobile structure 101. System 100 may then use these measurements to provide STM sensor calibration, which may then be used to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide STM sensor calibration for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water velocity impacting mobile structure 101. In various embodiments, system 100 may include multiple embodiments of speed sensor 142, such as one wind velocity sensor and one water velocity sensor. In various embodiments, speed sensor 142 may be referred to as an STM sensor.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10s of meters from a perimeter of mobile structure 101), visible spectrum and/or infrared/thermal imaging modules or cameras, stereo cameras, LIDAR systems, combinations of these, and/or other perimeter ranging systems configured to provide relatively fast and accurate perimeter sensor data (e.g., so as to accommodate suddenly changing navigation conditions due to external disturbances such as tide and wind loadings on mobile structure 101).

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles/positions.

Figure 1B:
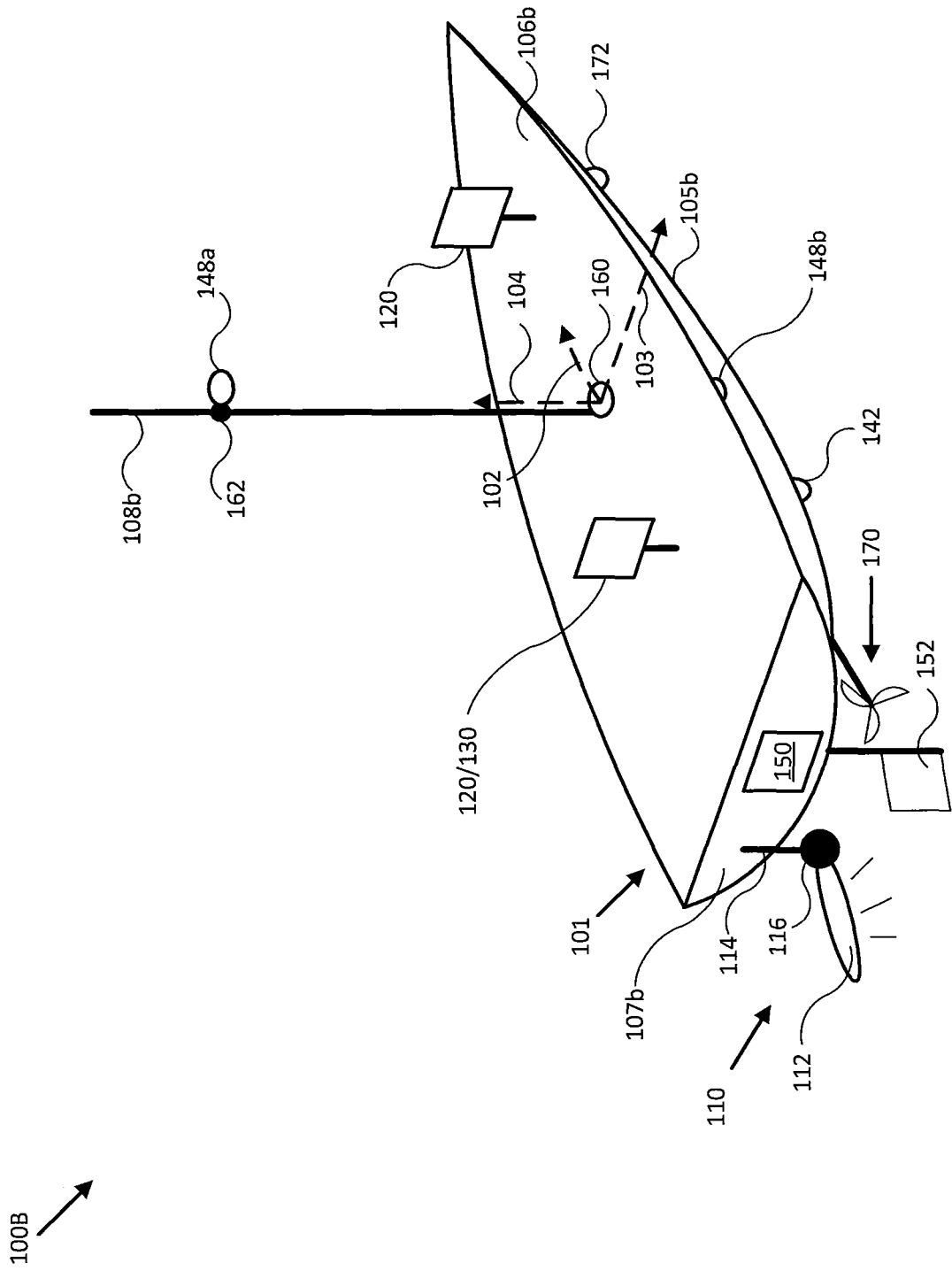
FIG. 1B illustrates a diagram of a watercraft including a passage planning system in accordance with an embodiment of the disclosure.
Figure 1C:
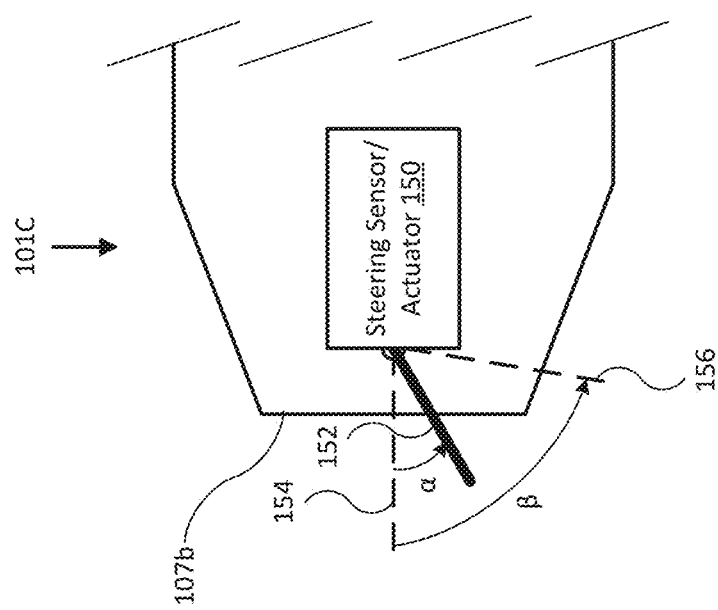
FIG. 1C illustrates a diagram of a steering sensor/actuator for a passage planning system in accordance with an embodiment of the disclosure.

For example, FIG. 1C illustrates a diagram of a steering sensor actuator for a passage planning system in accordance with an embodiment of the disclosure. As shown in FIG. 1C, rear portion 1010 of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (designated by a dashed line 154). In various embodiments, steering sensor/actuator 150 may be implemented with a steering actuator angle limit (e.g., the positive limit is designated by an angle $\beta$ and a dashed line 156 in FIG. 1C), and/or a steering actuator rate limit "R".

As described herein, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as a number of separate sensors and/or actuators, for example, to sense and/or control one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular navigation maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle $\alpha$ may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle $\alpha$ may be determined by controller 130 according to a pre-determined algorithm, for example, or through use of an adaptive algorithm for training various control loop parameters characterizing the relationship of steering angle $\alpha$ to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), controller area network (CAN) bus interfaces, and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide STM sensor calibration and/or additional operational control of mobile structure 101, similar to system 100 of FIG. 1B. For example, system 100B may include integrated user interface/controller 120/130, secondary user interface 120, perimeter ranging system 148a and 148b, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, and perimeter ranging system 148b (e.g., an ultrasonic sensor array and/or short range radar system)) coupled to hull 105b or deck 106b substantially above a water line of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of perimeter ranging system 148 according to control signals and/or an orientation or position of mobile structure 101 provided by user interface/controller 120/130. For example, user interface/controller 120/130 may be adapted to receive an orientation of transducer assembly 112 and/or perimeter ranging system 148 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down"

vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed, such as a STM or STW sensor configured to measure the relative speed of mobile structure 101 through a surrounding water medium, substantially along longitudinal axis 102. In some embodiments, speed sensor 142 may be adapted to provide a relatively thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
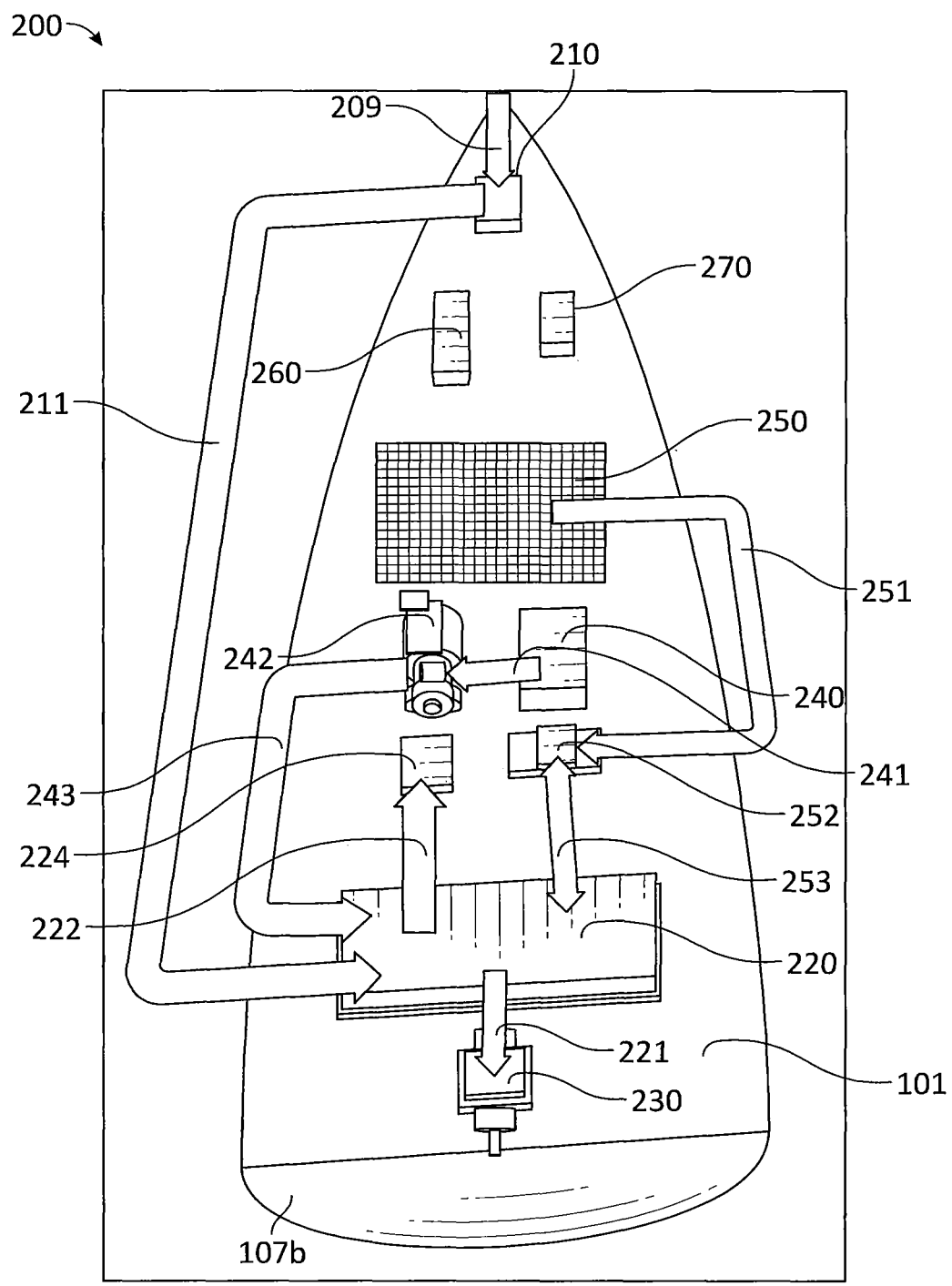
FIG. 2 illustrates a diagram of an electric propulsion system for a mobile structure with a passage planning system in accordance with an embodiment of the disclosure.

FIG. 2 illustrates a diagram of an electric propulsion system 200 for mobile structure 101 with elements of passage planning system 100 of FIGS. 1A-B, which may be implemented as an embodiment of propulsion system 170 and/or other elements of navigation system 190 of FIG. 1A. In particular, as shown in FIG. 2, electric propulsion system 200 may include a shore power coupling/converter 210 receiving external power 209 from a shore or dock hookup and providing external charging power 211 to main battery 220, which may be used to store and deliver mechanical propulsion power 221 to electric drive motor 230 to provide propulsive force to mobile structure 101 (e.g., through a propeller or other thrust system, as described herein). Electric propulsion system 200 may also include fuel tank 240 providing fuel according to fuel consumption 241 to combustion (e.g., diesel, gasoline) generator 242, which may be configured to provide generator charging power 243 to charge main battery 220 and/or power electric drive motor 230.

In some embodiments, electric propulsion system 200 may additionally or alternatively include solar panels 250 providing solar charging power 251 to leveling or ballast battery bank 252, which may be configured to provide or receive exchange power 253 to charge main battery 220 and/or help level charge across multiple cells within main battery 220. As shown in FIG. 2, electric propulsion system 200 may also include an accessory power sink 224, such as a cooler or fridge, for example, or an electronic navigation system (e.g., including elements of system 100 of FIG. 1A), that draws or consumes accessory power 222 from main battery 220. Electric propulsion system 200 may include a separate accessory battery 260 (e.g., used to start generator 242 and/or provide emergency power if main battery 220 is exhausted or damaged) and/or a communications module 270 (e.g., to communicate to other vessels or shore-based systems, including remote storage systems, as described herein).

Each of the elements of electric propulsion system 200 may be implemented with power (e.g., voltage and/or current) monitoring and/or switching circuitry to allow controller 130 of system 100, for example, to monitor and/or control power delivery to elements of electric propulsion system 200. Moreover, main battery 220, leveling battery bank 252, and accessory battery 260 may be implemented with charge state monitoring circuitry to allow controller 130 to monitor the various charge states of each battery. In various embodiments, controller 130 may be configured to receive an electrical status of electric propulsion system 200, including power delivery and/or charge state of each of the elements of electric propulsion system 200, and to determine an electric propulsion state of electric propulsion system 200 based on such status. Such electric propulsion state (e.g., an operational state of mobile structure 101) may be used, along with other factors, to determine an achievable range of mobile structure 101, as described herein.

Figure 3:
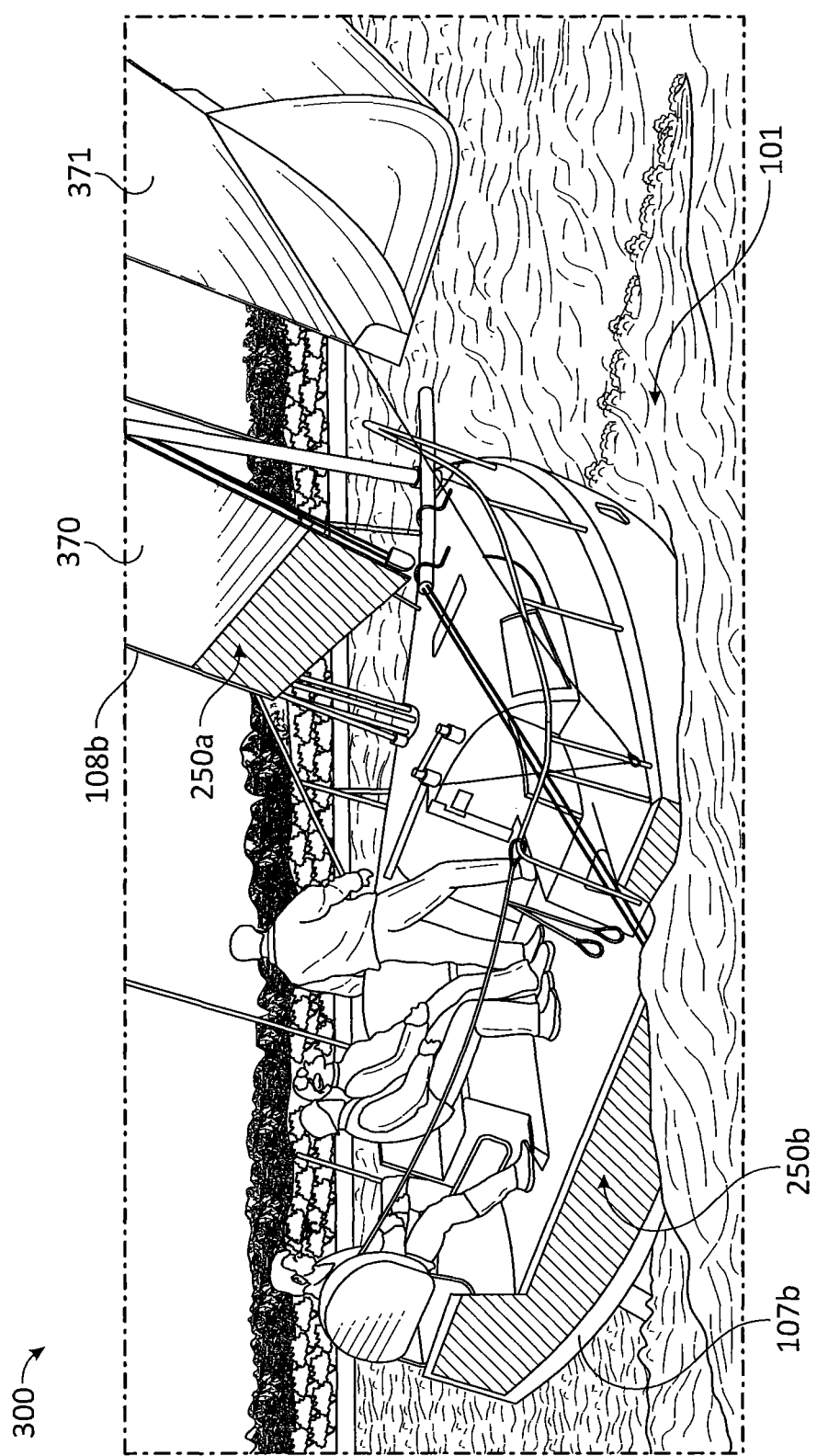
FIG. 3 illustrates a diagram of an electric propulsion system for a mobile structure with a passage planning system in accordance with an embodiment of the disclosure.

FIG. 3 illustrates a diagram of an electric propulsion system 300 for mobile structure 101 with elements of passage planning system 100 of FIGS. 1A-B, which may be implemented as an embodiment of propulsion system 170 and/or other elements of navigation system 190 of FIG. 1A. In particular, as shown in FIG. 3, electric propulsion system 300 may include one or more sails (e.g., mainsail 370 and/or headsail/spinnaker 371) coupled to mast 108b and configured to provide motive force to mobile structure 101, solar panels 250a implemented as part of a sail bag for mainsail 370 as shown, and solar panels 250b coupled to transom 107b of mobile structure 101. Each group of solar panels 250a and/or 250b may be used to provide solar charging power to help charge main battery 220. Moreover, the expected or predicted power delivery of each group of solar panels 250a and/or 250b may be dependent on time of day, the absolute orientation of mobile structure 101 (e.g., relative to the sun), the relative orientation of mainsail 370 and/or headsail 371, the sea state (e.g., level of chop or rolling waves obscuring solar panels 250*b*), and/or other factors, as described herein. The relationship of power delivery to any one or group of such factors may be characterized at manufacture, for example, or may be learned or supplemented with state measurements (e.g., power delivery measurements correlated with measured operational states of mobile structure 101, including environmental states) made while underway, which may be accumulated over time to refine such relationship.

Figure 4:
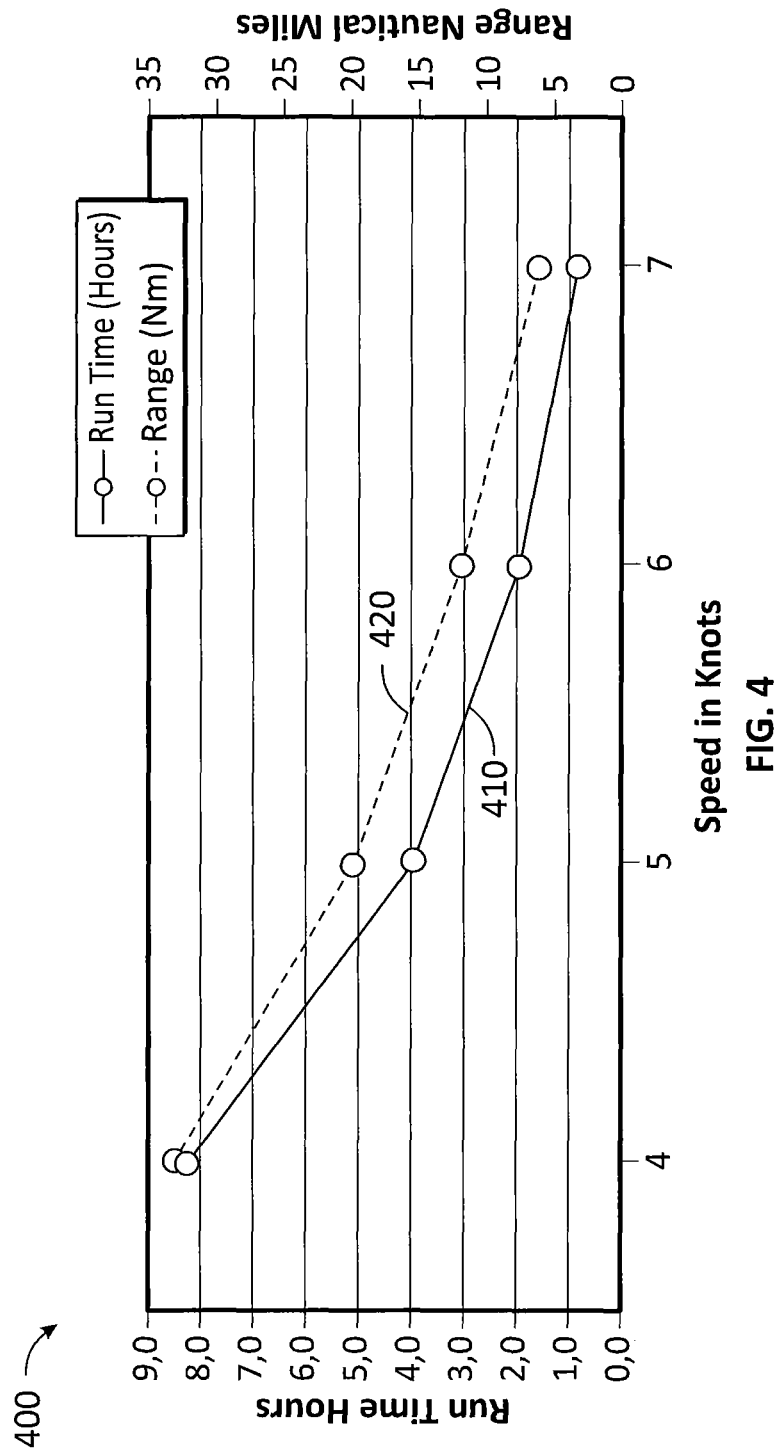
FIG. 4 illustrates a graph of runtime and corresponding achievable linear range as a function of vessel speed for an electric propulsion system of a mobile structure with a passage planning system in accordance with an embodiment of the disclosure.

Electric propulsion provides limited range that can be highly dependent on a selected vessel speed. FIG. 4 illustrates a graph 400 of runtime 410 and corresponding achievable linear range 420 as a function of vessel speed (e.g., assuming no water current effect and no assistance from wind) for electric propulsion system 200 and mobile structure 101 of FIG. 2. As can be seen from FIG. 4, as the desired or selected speed is decreased, the corresponding range generally increases, due to various factors including hull shape, hull drag, vessel weight, and electromechanical conversion efficiency, as described herein.

Figure 5:
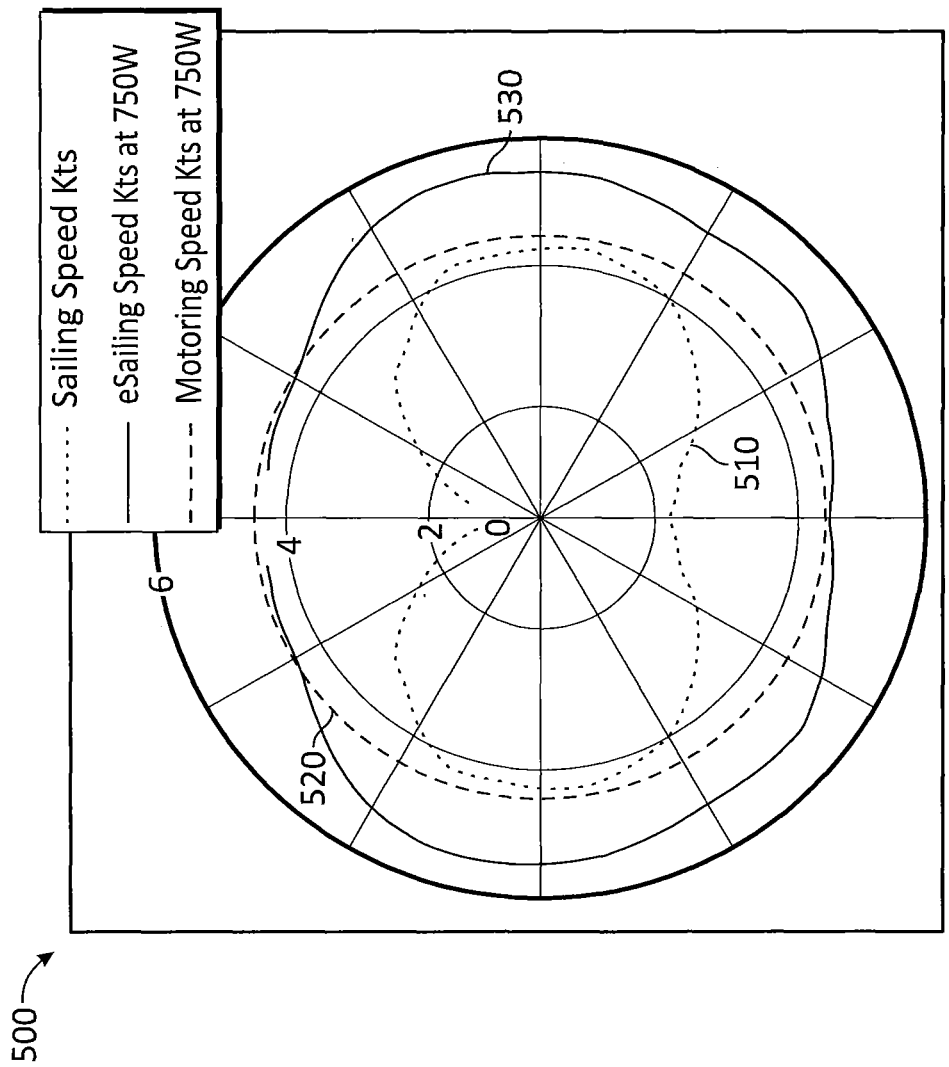
FIG. 5 illustrates a polar comparator chart showing an estimated speed of a mobile structure with a passage planning system when provided motive force by electric power, wind, or a combination of wind and electrical power, in accordance with an embodiment of the disclosure.

Motor-sailing (e.g., including e-sailing) can be extremely efficient and effective at certain wind angles, where small amounts of added mechanical power (e.g., electric or gas powered) can combine with the wind to extend the operational range of mobile structure 101. FIG. 5 illustrates a polar comparator chart or graph 500 showing the estimated speed of mobile structure 101 when provided motive force by electric power, wind, or a combination of wind and electrical power. In the embodiment shown in FIG. 5, chart 500 is generated with the assumption that there is a 4 knot true wind when estimating the speed of mobile structure 101 due to motive force provided by wind (e.g., and mainsail 370 and/or headsail 371) or a combination of wind and electric power. Plot 510 shows the estimated speed of mobile structure 101 generated by such true wind alone, as a function of relative wind angle/direction. Plot 520 (e.g., a dashed circle) shows the estimated speed of mobile structure 101 generated by electric drive motor 230 alone and consuming 750 W of power (e.g., with no wind effect). Plot 530 shows the estimated speed of mobile structure 101 generated by a combination of such true wind and electric drive motor 230 consuming 750 W of power.

As can be seen from chart 500, motor-sailing or e-sailing (e.g., represented by plot 530) can generate a speed sometimes more than 25% greater than that achievable by electric power or wind alone, and generally greater for more than 80% of the possible relative wind directions, using the same power input. As such, controller 130 may be configured to use such relationship to help determine a range of mobile structure 101 that benefits from such combinatorial effect, for example, or to determine a track for mobile structure 101 that takes advantage of such relationship to increase the range of mobile structure 101, reduce a rate of discharge of main battery 220, reduce a total discharge of main battery 220 associated with reaching a particular waypoint or destination, increase a speed of mobile structure 101 with respect to navigation to a desired destination, and/or otherwise adjust navigation of mobile structure 101, as described herein.

Figure 6:
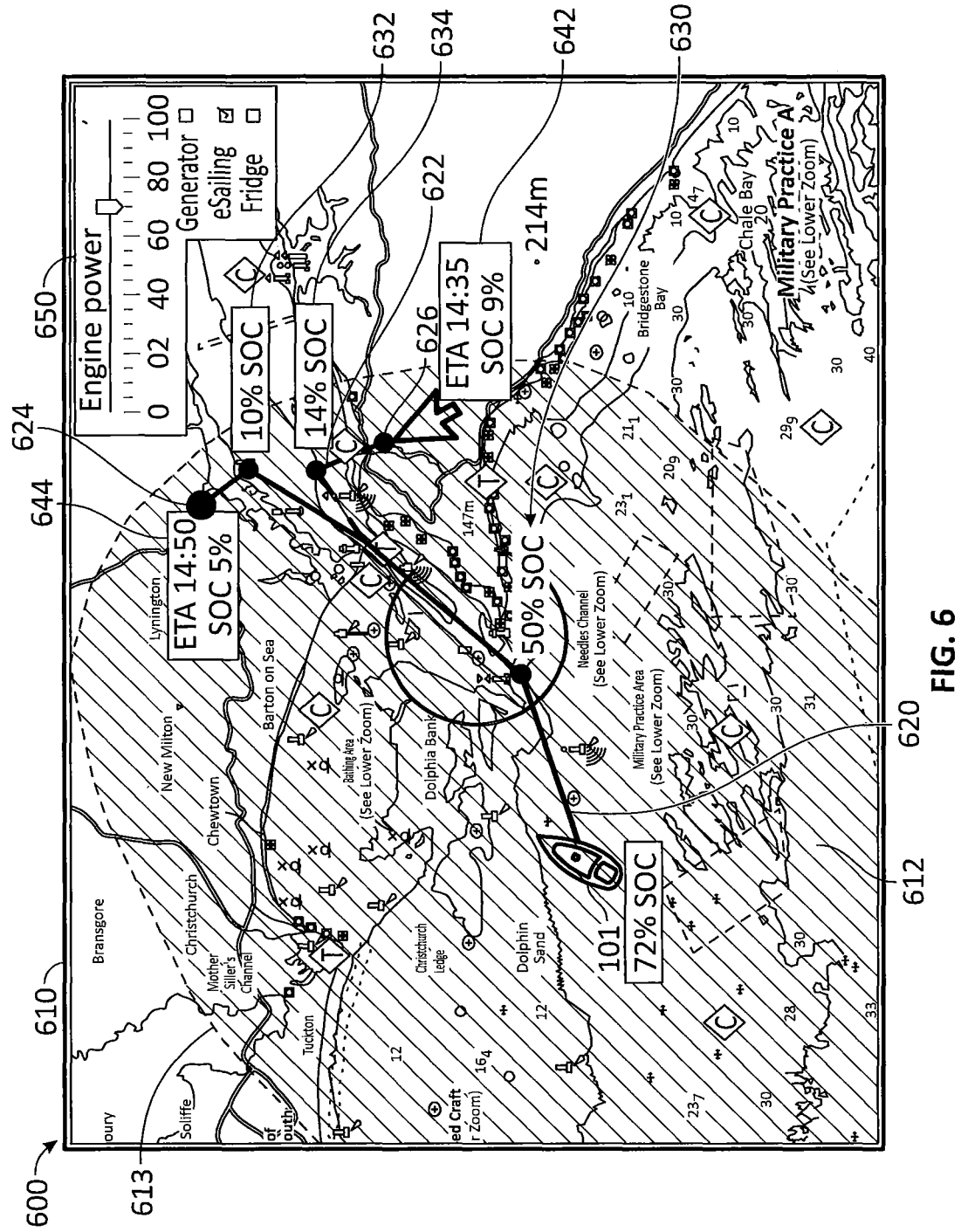
FIG. 6 shows a display view including an operational range map for a mobile structure with a passage planning system in accordance with an embodiment of the disclosure.

FIG. 6 shows a display view 600 including an operational range map or overlay for mobile structure 101 in accordance with an embodiment of the disclosure. In the embodiment presented by FIG. 1, display view 600 includes navigational chart 610 including operational range map 612 rendered as a shaded or colored semi-transparent area within dashed edge line 613 on chart 610. In various embodiments, operational range map 612 may be configured to show an operational range of mobile structure 101 as determined based on an operational state of mobile structure 101 and/or one or more environmental conditions associated with a position and/or orientation of mobile structure 101, a planned track or route 620 for mobile structure 101, and/or a planned destination 624 for mobile structure 101. Such environmental conditions may be measured by elements of system 100, for example, or may be received from other vessels or weather services broadcasting such environmental conditions.

In various embodiments, controller 130 of system 100 may be configured to determine an operational state of mobile structure 101 based, at least in part, on a desired propulsion mode selected at propulsion mode selector 650 and/or monitoring and/or sensor data provided by elements of system 100 and/or 200; to determine environmental conditions associated with mobile structure 101, the determined operational state of mobile structure 101, and/or a planned track or route 620 or destination 624 for mobile structure 101; and to determine operational range map 612 based on such determined operational state and/or environmental conditions. Once operational range map 612 is determined (e.g., its shape and/or extent, relative to a position of mobile structure 101 and/or an orientation of chart 610), controller 130 may be configured to render operational range map 612 over chart 610 on a display of user interface 120, for example, for display to a user to help facilitate route and/or passage planning for mobile structure 101. In some embodiments, controller 130 may be configured to detect that the present operational state of mobile structure 101 along planned route 620 will result in unsafe navigation or be impossible to complete, for example, and to autopilot mobile structure along an alternative route 622 to an alternative destination 626. As such, display view 600 provides a solution to autonomous or assisted route or passage planning, as described herein.

In the embodiment shown in FIG. 6, the pilot or user has used propulsion mode selector 650 to select (e.g., by user input provided to user interface 120) a power for electric drive motor 230 at 70% of full power with a slider of propulsion mode selector 650, no use of generator 242, use of mainsail 370 and/or headsail 371 (e.g., for e-sailing and/or combination of motor and wind propulsion), and reduced use of accessory power 222 (e.g., to turn off a cooler or refrigerator associated with accessory power sink 224). Such operational state of mobile structure 101 is reflected in the size and shape of operational range map 612, as rendered over chart 610. In general, operational range map 612 may be configured to show straight-line range capability to a minimum desired charge state, which may be set by a pilot or user (in FIG. 6, the minimum charge state for main battery 220 is set to zero). If the pilot reduces the power for electric drive motor 230, then operational range map 612 will generally expand, and more distant destinations will be shown within reach (e.g., overlaid by operational range map 612), and the shape of operational range map 612 will change according to the applicable/selected sail/motor power mix, similar as shown in FIG. 5, and according to the applicable environmental conditions.

In some embodiments, controller 130 may be configured to render route 620 on chart 610 as the track to the chosen destination 624 and to render state of charge (SOC) identifiers 630, 632, 634 at each waypoint and, in addition, at intermediate points for relatively long tracks in between waypoints (e.g., shown as circular nodes along route 620 and/or alternative route 622). An estimated time of arrival (ETA) and SOC identifier 644 may be rendered at planned destination 624. As shown in FIG. 6, display view 600 indicates that passage planning system 100 estimates reaching planned destination 624 (Lymington harbor) with 5% charge remaining in main battery 220.

In various embodiments, a pilot may interrogate other waypoints or alternative route 622 and/or alternative destination 626 by selecting alternative destination 626. Upon detecting such user selection, controller 130 may be configured to render a dotted black track line to show a recommended alternative route 622 to alternative destination 626 with corresponding estimated SOCs and, with respect to alternative destination 626, an ETA and SOC identifier 642. Alternative destination 626 (Yarmouth harbor) is shown as reachable with 9% charge remaining in main battery 220. In some embodiments, each SOC identifier may be replaced with an ETA and SOC identifier, according to one or more user display settings and/or the number of waypoints shown in display view 600 (e.g., fewer waypoints and identifiers might allow larger and more informative identifier to be rendered without cluttering display view 600 or obscuring important chart detail). In various embodiments, operational range map 612 is indicative (e.g., straight line paths are not generally possible), but the cursor/dotted-track may be normative (e.g., system 100 may be configured to determine a best (e.g., lowest power usage, safest traversal, quickest traversal) route to a selected waypoint or destination.

When determining operational range map 612, planned route 620, and/or alternative route 622, system 100 may account for wind direction and speed, water current, sea state, and/or other factors, for example, and project these factors forward in time, based on one or more environmental forecasts (e.g., meteorological or GRIB forecasts, tidal databases) and/or (e.g., in case of air or sea states) a mix of forecast and measured or known environmental conditions, such as wind direction and speed (e.g., wind over tide produces stronger seas). The effect of sea state on performance of mobile structure 101 may be provided in tabular form or estimated based on a simplified analytical function, as described herein.

In some embodiments, system 100 may be configured to determine and/or select a particular power for electric drive motor 230 upon receiving a user selected destination and/or desired minimal SOC, for example, to ensure reaching planned destination 624, for example, or to account for changing and/or unpredicted environmental conditions along route 620. Thereby, system 100 is able to optimize power utilization to account for the present and future conditions (e.g., operational state of mobile structure 101 and/or various environmental conditions). For example, if the tide will turn in one hour, it may be futile to push into it; it may be better to conserve energy for the next 45 minutes then apply a higher power level, in order to reach planned destination 624 at a desired ETA.

In further embodiments, system 100 may be configured to determine a route start time based on one or more user selected passage criteria. For example, a user may select to emphasize one or more of shortest journey time, least fuel consumed, smoothest ride (e.g., avoiding wind-over-tide scenarios), a specific arrival time, a range of arrival times, a combination of these, and/or other passage criteria, for example, generally intended for selection before departure, where the journey start-time is determined based on such criteria.

While such route or passage planning techniques are intended for use with electric or hybrid electric (diesel/sail/ electric in any combination) watercraft, they may be applicable to any power source, including combustion engine based propulsion systems, and to terrestrial or air based mobile structures. Moreover, such techniques are not limited to planning; similar systems and techniques may be used to dynamically adjust power to electric drive motor 230, for example, to maintain an optimal balance between sail and motor power as wind speed and/or direction changes (e.g., as described with respect to polar chart 500 of FIG. 5). For example, a pilot or user may select passage criteria including holding a steady 5 kts along planned route 620, and system 100 may increase power to electric drive motor 230 as wind speed drops and reduce power as wind speed increases.

In some embodiments, system 100 may be configured to determine a risk profile associated with a number of selected or otherwise determined alternative routes (e.g., planned route 620 and alternative route 622) and render each alternative route according to a preselected color mapping to indicate one route is riskier than another. In other embodiments, system 100 may be configured to render operational range map 612 according to a similar color mapping to indicate navigation to portions of operational range map 612 is riskier than navigation to other portions. In various embodiments, such color mapping may be configured to emphasize differentiation across a particular range of risk values within the risk profile, which may generally be implemented as a set of percentages (e.g., each 0-100%) linked with a particular route, set of waypoints, and/or other sets of spatial and/or temporal positions represented on chart 610.

Such risk profile may be based on a set of risk criteria, which may be selected by a user as part of the configuration settings or parameters for passage planning system 100. For example, such risk criteria may include risk of failing to reach a particular position within operational range map 612 due to known variability (or lack of reliability) of environmental forecasts associated with a route to such position, risk of being stranded without electrical power at such position (e.g., at sea vs. at berth, determined with or without applicable e-sailing capabilities), risk of delay in reaching such position (e.g., when the passage criteria includes a desired arrival time) caused by environmental conditions (e.g., tide, wind direction and strength, measured and/or forecasted), an operational state of mobile structure 101 (e.g., planned accessory power draw, availability of solar charging), and/or route timing criteria (e.g., tidal gate or lock opening/closing) along the route to such position.

In various embodiments, system 100 may be configured to update the risk profile and the rendering of alternative routes and/or operational range map 612 as mobile structure traverses operational range map 612. In some embodiments, system 100 may be configured to render operational range map 612 according to extents based on an achievable linear range of electric propulsion system 200, various environmental conditions, an operational state of mobile structure 101, and a user selected maximum acceptable risk value (e.g., a type of risk criteria).

FIGS. 7-10 illustrate flow diagrams of control loops to provide passage planning in accordance with embodiments of the disclosure. In particular, FIGS. 7-10 include control loops to determine a predicted speed of mobile structure 101 based, at least in part, on applicable forecasted environmental conditions, the sailing characteristics of mobile structure 101, and/or the assisted sailing (e.g., e-sailing) capabilities of mobile structure 101. In some embodiments, the operations of FIGS. 7-10 may be performed by controller 130 processing and/or operating on signals received from one or more of sensors 140-148, navigation control system 190, user interface 120, and/or other modules 180. For example, in various embodiments, control loop 700 (and/or other control loops of FIGS. 8-10) may be implemented and/or operated according to any one or combination of the systems and methods described in International Patent Application No. PCT/US2014/13441 filed Jan. 28, 2014 and entitled "STABILIZED DIRECTIONAL CONTROL SYSTEMS AND METHODS," and/or U.S. patent application Ser. No. 14/321,646 filed Jul. 1, 2014 and entitled "STABILIZED DIRECTIONAL CONTROL SYSTEMS AND METHODS," each of which are hereby incorporated by reference in their entirety.

In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of in the control loops may be performed in an order or arrangement different from the embodiment illustrated by FIGS. 7-10. For example, although control loop 720 shown in detail in FIG. 8 includes block 828, in other embodiments, block 828 may not be present, for example, and/or may be replaced with a look up table generated through use of one or more sensors providing corresponding measured data.

Figure 7:
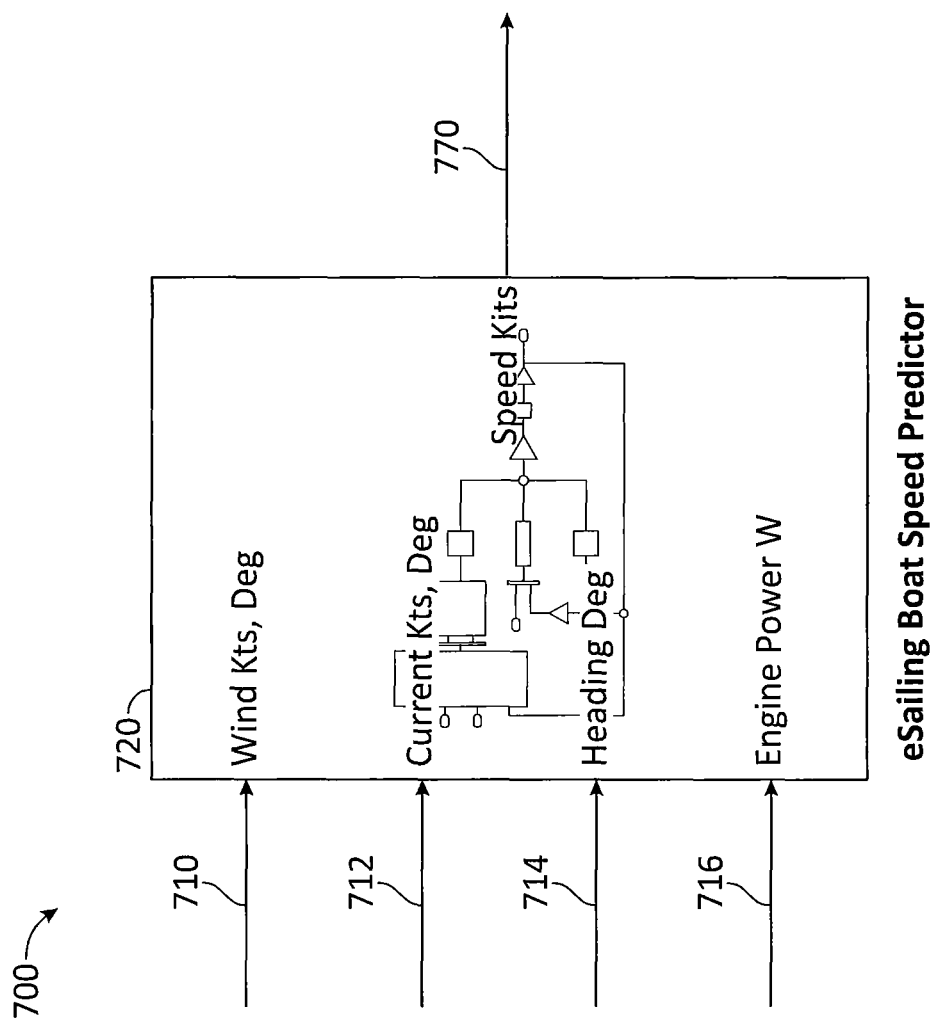

As shown in FIG. 7, control loop 700 includes speed predictor block 720 providing a predicted linear/longitudinal speed (e.g., speed through water) for mobile structure 101. For example, speed predictor block 720 may be configured to receive a time series of forecasted environmental conditions (e.g., true wind velocities (speed and direction) 710, current velocities (speed and direction) 712) and predicted and/or selected operational states of mobile structure 101 (e.g., headings 714 of mobile structure 101, mechanical propulsion powers 716), which may be associated with a planned route for mobile structure 101, for example, and determine a time series of predicted speeds 770 of mobile structure 101. As described herein, control loop 700 may be used provide predicted speeds 770 as part of a passage planning process before mobile structure 101 initiates a planned route, for example, and may also be used during transit along a planned route to, for example, update operational range map 612, update a risk profile associated with operational range map 612 and/or planned route 620 and alternative route 622, or to determine or update any other passage state data associated with a passage plan or route, as described herein.

Figure 8:
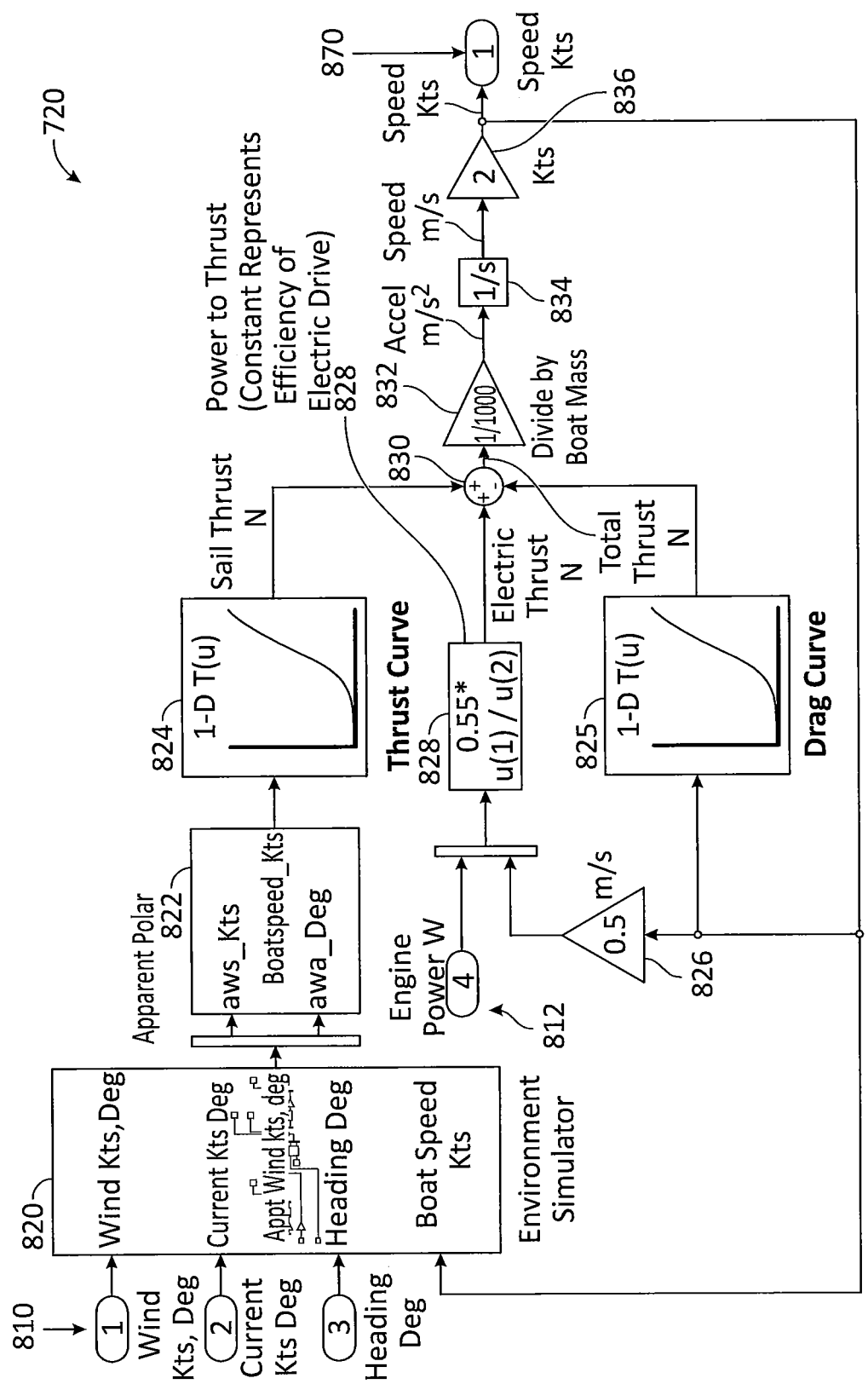

As shown in FIG. 8, speed predictor block 720 may be implemented by apparent wind simulator block 820, sailing polar converter block 822, thrust and drag curve blocks 824 and 825, applied thrust predictor block 828, and various other blocks configured to generate predicted speeds 870 of mobile structure 101. For example, apparent wind simulator block 820 may be configured to receive forecasted environmental condition and predicted and/or selected operational state inputs 810 as shown and provide simulated apparent wind velocities (speed and direction, as felt by/in the coordinate frame of mobile structure 101) to sailing polar converter block 822. Sailing polar converter block 822 may be configured to receive the simulated apparent wind velocities and provide predicted sailing speeds to thrust curve block 824. Thrust curve block 824 may be configured to convert the predicted sailing speeds to predicted sailing thrusts (e.g., in units of force) generated by mobile structure 101 in response to the predicted sailing speeds and provide the predicted sailing thrusts to combinatorial block 830.

Applied thrust predictor block 828 may be configured to convert selected and/or predicted mechanical propulsion powers 812 and prior predicted speeds for mobile structure 101 (e.g., as converted by unit conversion block 826 as necessary) into predicted mechanical propulsion thrusts generated by mobile structure 101 in response to mechanical propulsion powers 812 and provide the predicted mechanical propulsion thrusts to combinatorial block 830. Drag curve block 825 may be configured to convert prior predicted speeds for mobile structure 101 into predicted drag thrusts generated by mobile structure 101 in response to the prior predicted speeds and provide the predicted drag thrusts to combinatorial block 830.

Combinatorial block 830 may be configured to combine the predicted sailing thrusts, mechanical propulsion thrusts, and drag thrusts and generate predicted passage thrusts, which may then be converted into predicted speeds 870 of mobile structure 101 by force to acceleration converter block 832, acceleration to velocity integrator block 834, and/or unit conversion block 836, as desired. In some embodiments, force to acceleration converter block 832 may be configured to receive a time series of predicted masses for mobile structure 101, where the mass of mobile structure 101 changes over the course of a planned route, such as due to fuel consumption, for example.

In various embodiments, parameters for sailing polar converter block 822, thrust and drag curve blocks 824 and 825, and/or applied thrust predictor block 828 may be supplied by a manufacturer, for example, or may be determined through directed sea trials (patterns of navigational maneuvers of mobile structure 101) or through accumulation of sensor data over time that measures the response of mobile structure 101 to various environmental conditions and/or operational states of mobile structure 101. In some embodiments, thrust and drag curve blocks 824 and 825 may use identical parameters, where, as shown in FIG. 8, drag curve block 825 is driven by the predicted speed of mobile structure 101 and thrust curve block 824 is driven by predicted sailing speed generated by mobile structure 101 in response to an applicable apparent wind.

Figure 9:
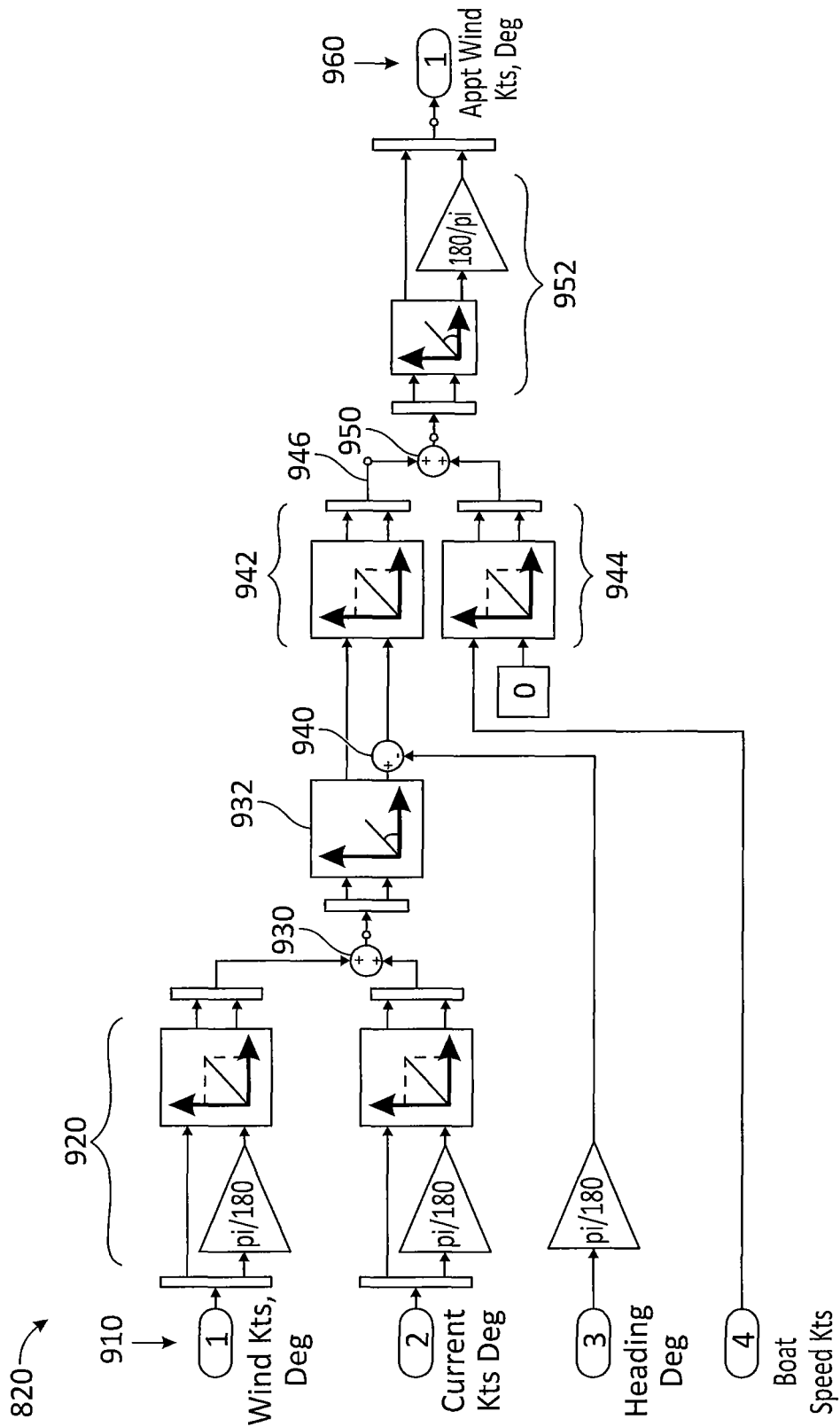

As shown in FIG. 9, apparent wind simulator block 820 may be implemented by various coordinate conversion blocks 920, 932, 942, 944, and 952; and various combinatorial blocks 930, 940, and 950, configured to add the various vectors of wind, current, and velocity of mobile structure 101 (heading and speed) to generate simulated apparent wind velocities. For example, coordinate conversion blocks 920 may be configured to convert environmental condition inputs 910 into cartesian coordinates and provide them to combinatorial block 930, which combines them and provides the combined environmental speed effects to coordinate conversion block 932. Coordinate conversion block 932 converts the environmental speed effects back to polar coordinates and combinatorial block 940 transforms them to the frame of mobile structure 101. Coordinate conversion block 942 converts the transformed environmental speed effects to cartesian coordinates and provides them to combinatorial block 950. Coordinate conversion block 944 converts prior predicted speeds of mobile structure 101 (e.g., in the frame of mobile structure 101) to cartesian coordinates and provides them to combinatorial block 950, which combines the prior predicted speeds and the transformed environmental speed effects to produce apparent wind velocities in cartesian coordinates. Coordinate conversion block 952 converts those cartesian apparent wind velocities into polar apparent wind velocities 960.

As shown in FIG. 10, sailing polar converter block 822 may be implemented as executable script and/or program code configured to receive apparent wind velocities and generate corresponding predicted sailing speeds, based, at least in part, on a true or apparent wind polar (e.g., similar to plot 510 in FIG. 5), which may then be provided to thrust curve block 824. For example, sailing polar converter block 822 may be configured to determine a predicted sailing speed generated by mobile structure 101 in response to a simulated apparent wind provided by apparent wind simulator block 820 using a true wind polar (e.g., discretized into true wind polar matrix 1002) associated with mobile structure 101. In the embodiment shown in FIG. 10, true wind polar matrix 1002 is converted to an apparent wind polar matrix in block 1004 that is used (e.g., through interpolation) to determine an appropriate predicted sailing speed associated with the specific applied apparent wind velocity.

Figure 11:
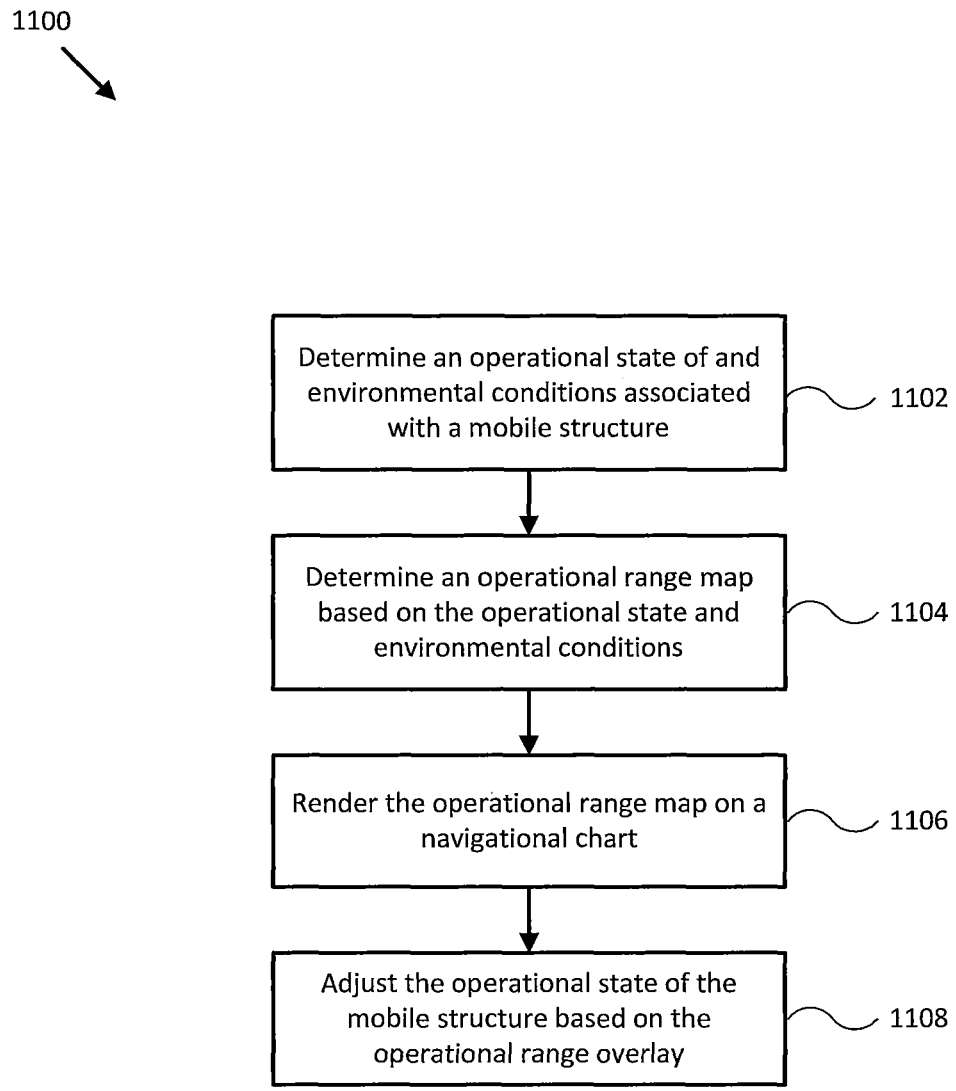
FIG. 11 illustrates a flow diagram of a process to provide range estimation and/or facilitate passage planning for a mobile structure with a passage planning system in accordance with an embodiment of the disclosure.

FIG. 11 illustrates a flow diagram of a process 1100 to provide range estimation and/or facilitate passage planning for mobile structure 101 implemented with passage planning system 100 in accordance with an embodiment of the disclosure. More generally, process 1100 may be used to provide general navigational control for mobile structure 101. It should be appreciated that any step, sub-step, sub-process, or block of process 1100 may be performed in an order or arrangement different from the embodiments illustrated by FIG. 11. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1100 is described with reference to systems, processes, control loops, and images described in reference to FIGS. 1A-10, process 1100 may be performed by other systems different from those systems, processes, control loops, and images and including a different selection of electronic devices, sensors, assemblies, mobile structures, and/or mobile structure attributes, for example.

In block 1102, an operational state of and environmental conditions associated with a mobile structure are determined. For example, controller 130 may be configured to determine an operational state of mobile structure 101 based on monitoring and/or sensor data provided by elements of system 100 and/or 200. In some embodiments, such operational state may include an electric propulsion state of system 200, a position and/or orientation of mobile structure 101, and/or other operational states of mobile structure 101, as described herein. Such operational state may be determined based on monitoring data provided by elements of systems 100 and/or 200, such as a charge state for main battery 230, for example, and/or sensor data provided by elements of system 100, such as orientation and/or position data provided by one or more of orientation sensor 140, gyroscope/accelerometer 144, GNSS 146, and/or a combination of those, and/or other sensor data or control signals provided by other elements of system 100. In related embodiments, controller 130 may be configured to determine an operational state of mobile structure 101 based on a desired propulsion mode selected at propulsion mode selector 650, as described herein.

In some embodiments, controller 130 may be configured to determine environmental conditions associated with mobile structure 101 based on sensor data provided by elements of system 100. For example, controller 130 may be configured to receive a wind speed and/or direction from speed sensor 142, a water current speed from GNSS 146 and/or speed sensor 142, motion information from gyroscope/accelerometer 144 indicating sea state, a time of day and/or sun position from GNSS 146, and/or other environmental conditions from other vessels or weather services through a communications module (other modules 180 and/or communications module 270), and such conditions may be associated with a present and/or planned position, orientation, and/or route of mobile structure 101.

In some embodiments, the operational state includes an electric propulsion state, a heading, and/or a position of mobile structure 101 and the environmental conditions include a wind velocity and/or a current velocity associated with the mobile structure and/or a planned route for the mobile structure. For example, controller 130 may be configured to determine the environmental conditions by receiving environmental sensor data, position data, and/or orientation data from corresponding sensors mounted to mobile structure 101 and/or determining a wind velocity and/or a current velocity associated with mobile structure 101 based on the environmental sensor data, the position data, and/or the orientation data.

In other embodiments, controller 130 may be configured to determine passage criteria associated with a planned route for mobile structure 101, such as planned route 620 and/or destination 624. For example, controller 130 may be configured to receive a first portion of the passage criteria as user input provided to user interface 120 and to determine a second portion of the passage criteria based, at least in part, on the first portion of the passage criteria and the operational state of mobile structure 101. In some embodiments, the first portion of the passage criteria includes a destination and a desired arrival time and the second portion of the passage criteria comprises a series of waypoints defining the planned route and a corresponding series of mechanical propulsion power levels to be provided by main battery 220 of mobile structure 101 to propulsion system 200. More generally, passage criteria may be determined by user selection of passage criteria and/or other parameters, as disclosed herein.

In block 1104, an operational range map is determined. For example, controller 130 may be configured to determine a size, shape, and/or extent of operational range map 612 based on the operational state and/or environmental conditions determined in block 1102. In some embodiments, controller 130 may be configured to determine a set of straight line range estimations from a current position of mobile structure 101, differentiated from each other by absolute orientation (e.g., heading), where each straight line range estimation is based on a desired speed and/or power output, an estimated wind direction and speed, an estimated water current direction and speed, an electric propulsion state of electric propulsion system 200, and/or other factors, as described herein. Controller 130 may then determine the size, shape, and/or extent of operational range map 612 by linking the ends of adjacent lines in the set of straight lines to form edge line 613 and designating the area within edge line 613 and including the position of mobile structure 101, as shown on chart 610, as operational range map 612.

In related embodiments, controller 130 may be configured to use position sensor/GNSS 146 to set an initiation position for the generation of operational range map 612. In such embodiments, the determining the operational range map may include determining a set of straight line range estimations from the initiation position of mobile structure 101 provided by GNSS 146, where each straight line range estimation is based, at least in part, on a series of predicted speeds of the mobile structure along each straight line range estimation, and where each predicted speed is based, at least in part, on the operational state of the mobile structure and a true or apparent wind polar associated with the mobile structure, as shown and described in FIGS. 7-10.

In block 1106, an operational range map is rendered on a navigational chart. For example, controller 130 may be configured to render operational range map 612 over chart 610 on a display of user interface 120. In some embodiments, controller 130 may be configured to render SOC identifiers along planned route 620, for example, and/or ETA and SOC identifiers at planned destination 624. In related embodiments, controller 130 may be configured to receive user selection of additional waypoints, alternative route 622, alternative destination 626, and/or other selections corresponding to points on chart 610, for example, and to render SOC and/or ETA and SOC identifiers with such selections. Controller 130 may also be configured to render propulsion mode selector 650 over a portion of chart 610 and to receive user selection of a particular propulsion mode associated with operation of mobile structure 101. Controller 130 may be configured to update the determined operational state of mobile structure 101 according to the selected propulsion mode, for example, and determine operational range map 612 based on such updated operational state.

In block 1108, an operational state of a mobile structure is adjusted. For example, controller 130 may be configured to detect that planned destination 624 is outside operational range map 612. Upon such detection, controller 130 may be configured to display or sound an alert to the pilot of mobile structure 101, for example, and/or to adjust an operational state of mobile structure 101 to expand operational range map 612 to include planned destination 624 or to pilot mobile structure 101 according to alternative route 622 to alternative destination 626 that is within operational range map 612. In some embodiments, controller 130 may be an operational state controller for mobile structure 101 and may be configured to adjust the operational state of mobile structure 101 based, at least in part, on the operational range map determined in block 1104 and/or passage criteria associated with a planned route for the mobile structure and determined in block 1102. In such embodiments, the operational state of mobile structure 101 may include a main battery charge level for main battery 220 of propulsion system 200, and the adjusting the operational state of mobile structure 101 may include adjusting mechanical propulsion power 221 provided by main battery 220 to electric drive motor 230 of propulsion system 200.

In various embodiments, a planned route and/or destination may initially be undefined, and user selection of such route and/or destination may occur after operational range map 612 is rendered on a display of user interface 120. Once such planned route or destination is selected, system 100 may be configured to determine an operational state of mobile structure 101 to reach such planned destination at a selected ETA, for example, and/or according to other passage criteria. If a planned route or destination is initially outside operational range map 612, system 100 may be configured to determine an updated operational state of mobile structure 101 to expand operational range map 612 and/or adjust the planned route to reach such planned destination, which may also account for one or more associated passage criteria. If, during navigation along a planned route towards a planned destination, environmental conditions change such that the planned destination is outside an updated operational range map 612 or is otherwise unsafe, system 100 may be configured to alert the pilot of mobile structure 101 and navigate to a safe anchor position, a charging station, a harbor within the updated operational range map 612, and/or according to various selected and/or updated passage criteria.

Embodiments of the present disclosure can thus provide reliable and accurate route and/or passage planning for mobile structures. Such embodiments may be used to provide assisted and/or fully autonomous navigation of a mobile structure and may assist in the operation of other systems, devices, and/or sensors coupled to or associated with the mobile structure, as described herein.

In accordance with additional related embodiments of the present disclosure, passage planning systems and methods may provide techniques for traversing a planned route safely using augmented reality (AR) display views, as described herein. Passage planning systems with AR display views help users visualize and identify critical objects and hazards along their planned route, particularly in the context of regulatory rules and personal preferences governing the traversal of such route. For example, cardinal marks have a safe side, boats should pass port to port, channel marks should be respected, fishing floats avoided, and the particular route excursion chosen to avoid such objects can be tailored to a particular user preference. Disclosed herein are techniques to apply maritime navigation rules and present a suggested action to a user in a clear simple manner, which may be accompanied by audible alarms. Also disclosed are techniques to use such rule-based approach to enable a self-driving vessel.

Figure 12A:
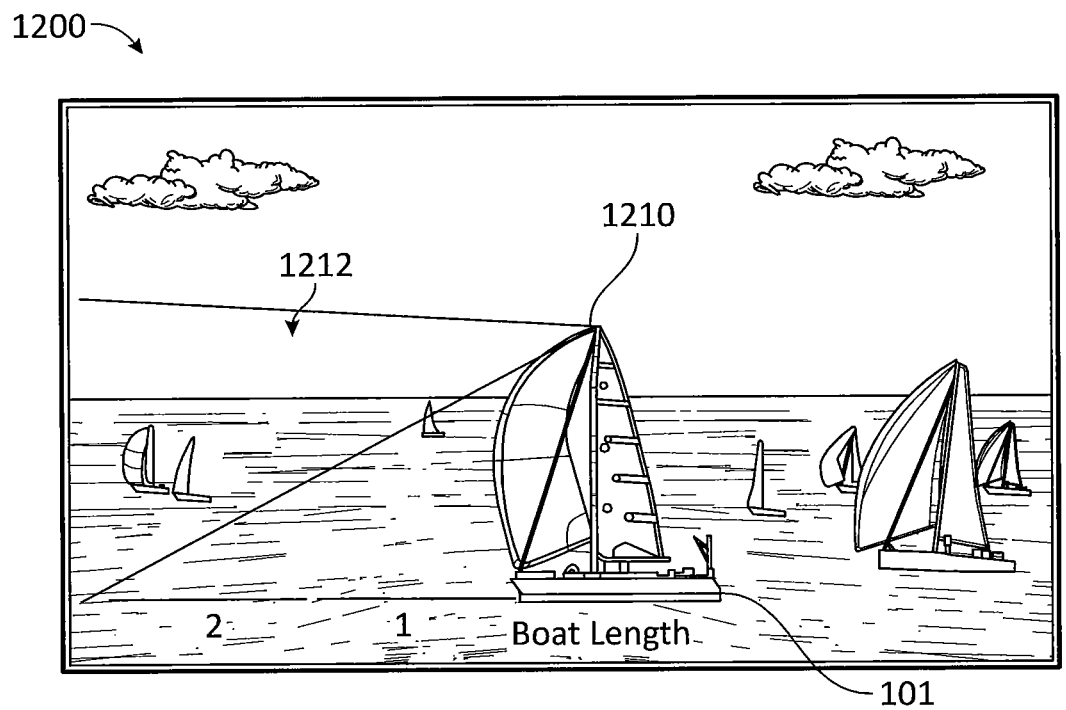
FIGS. 12A-B illustrate diagrams of an imaging system for use with a passage planning system in accordance with an embodiment of the disclosure.
Figure 12B:
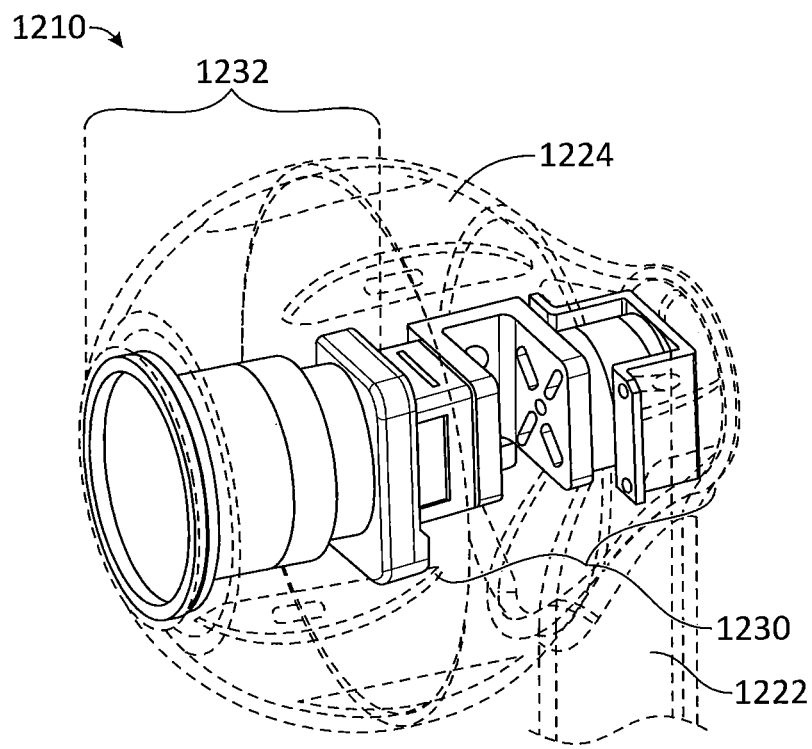

FIGS. 12A-B illustrate diagrams of an imaging system 1210 for use with a passage planning system in accordance with an embodiment of the disclosure. For example, imagery provided by imaging system 1210 may be used to generate AR display views, as described herein. As shown in diagram 1200 of FIG. 12A, imaging system 1210 may be mounted to the top of a mast of mobile structure 101 to provide a relatively wide field of view (FOV) 1212 that can include the horizon and the water surface within 1-2 boat lengths of mobile structure 101, as shown.

Contemporary digital cameras have so many pixels that they can combine a relatively wide FOV 1212 with good resolution (i.e., viewing range), which allows electronic stabilization to be a useful an effective stabilization technique. However, infrared cameras, and particularly thermal cameras, typically have a smaller number of available pixels, and so it is preferable to stabilize the roll axis of the FOV and use electronic stabilization only on the pitch axis. This makes such camera useful for sailboats as well as power boats, and by making the camera small and light, it can be installed at the masthead, as shown in diagram 1200, providing a clear viewpoint even when under sail.

FIG. 12B illustrates imaging system 1210 with such mechanical roll stabilization. For example, as shown in FIG. 12B, imaging system 1210 includes mounting arm 1222 and sealed housing 1224 configured to mount to the mast of mobile structure 101. Inside housing 1224 are mechanical stabilizer 1230 and imaging module 1232. In various embodiments, mechanical stabilizer 1230 may be configured to provide mechanical roll stabilization only, and imaging system 1210 and/or controller 130 may be configured to provide electronic pitch and/or yaw stabilization (with respect to the FOV of imaging system 1210). In some embodiments, mechanical stabilizer 1230 may be configured to provide mechanical roll and pitch stabilization. Mechanical stabilizer 1230 may be implemented by an articulated mount for imaging module 1232 and a motor, actuator, and/or weight, for example. Imaging module 1232 may be implemented as a visible spectrum or infrared spectrum (thermal) camera, for example, or as a combined or multi-spectrum camera. Imaging system 1210 may be powered by solar cells or by wire to other elements of system 100, for example, and may communicate imagery to controller 130 and/or user interface 120 via wired and/or wireless data connections.

While it is unusual to stabilize only the roll axis mechanically, and to stabilize the pitch but not yaw axes electronically, such combination is highly suited to maritime applications for thermal cameras and is relatively cost efficient to manufacture (see FIG. 12B, where a motor (mechanical stabilizer 1230) provides roll rotational alignment, and the window does not move, and is small and so low-cost). The approach is also valid for visible cameras, and in some applications, it may be desirable to stabilize pitch mechanically too.

Figure 13:
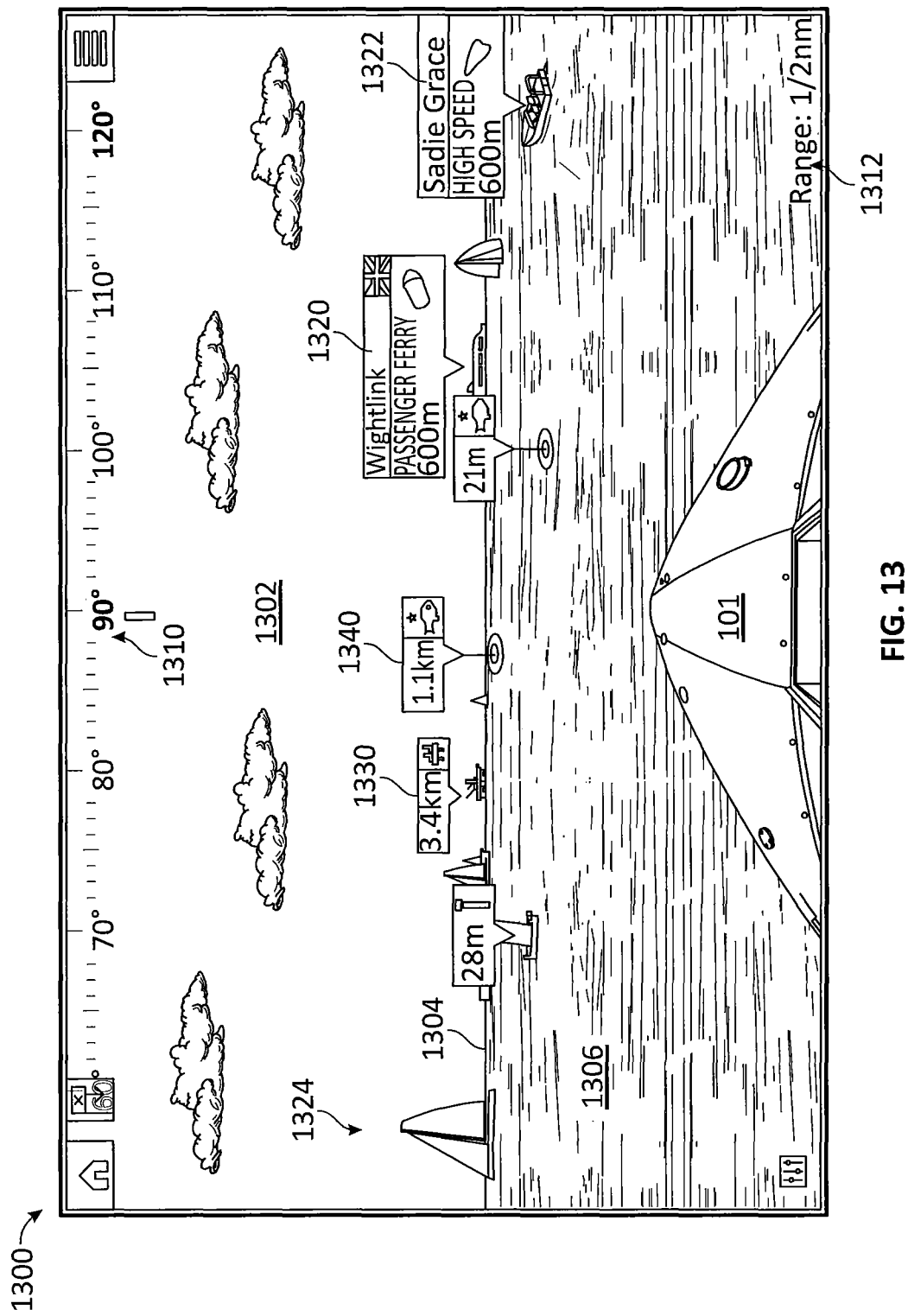
FIG. 13 shows an augmented reality (AR) display view for a mobile structure with a passage planning system in accordance with an embodiment of the disclosure.

FIG. 13 shows an augmented reality (AR) display view 1300 for mobile structure 101 with passage planning system 100 in accordance with an embodiment of the disclosure. As shown in FIG. 13, AR display view 1300 has an FOV (e.g., provided by imaging system 1210) that includes sky 1302, horizon 1304, and sea surface 1306 from the horizon and approaching a perimeter of mobile structure 101. Also shown in AR display view 1300 are heading indicator 1310, detector range indicator 1312, and various AR markers rendered within AR display view 1300 to indicate various characteristics of recognized objects.

For example, vessel marker 1320 includes a nationality and descriptor of the vessel, range to the vessel, and includes a header rendered green to show no risk of collision. Vessel marker 1322 has much the same information but its header is rendered red to show there may be risk of collision based on the heading of that vessel. Vessel 1324 has not been rendered with a marker because it hasn't been recognized or it is sufficiently outside the planned route of mobile structure 101. Marker 1330 includes similar information for a stationary drill rig but lacks a colored header because it is too far away to evaluate for collision purposes. Marker 1340 indicates a user-defined saved waypoint corresponding to a desired fishing area. Other markers may indicate range to or depth of water at that point. Embodiments described herein supplement AR display view 1300 with additional navigational information, such as navigational error alerts, safe areas associated with warning buoys, and/or other navigational questions. Embodiments also use similar techniques to autopilot mobile structure 101 and make safety critical course changes automatically.

Figure 14A:
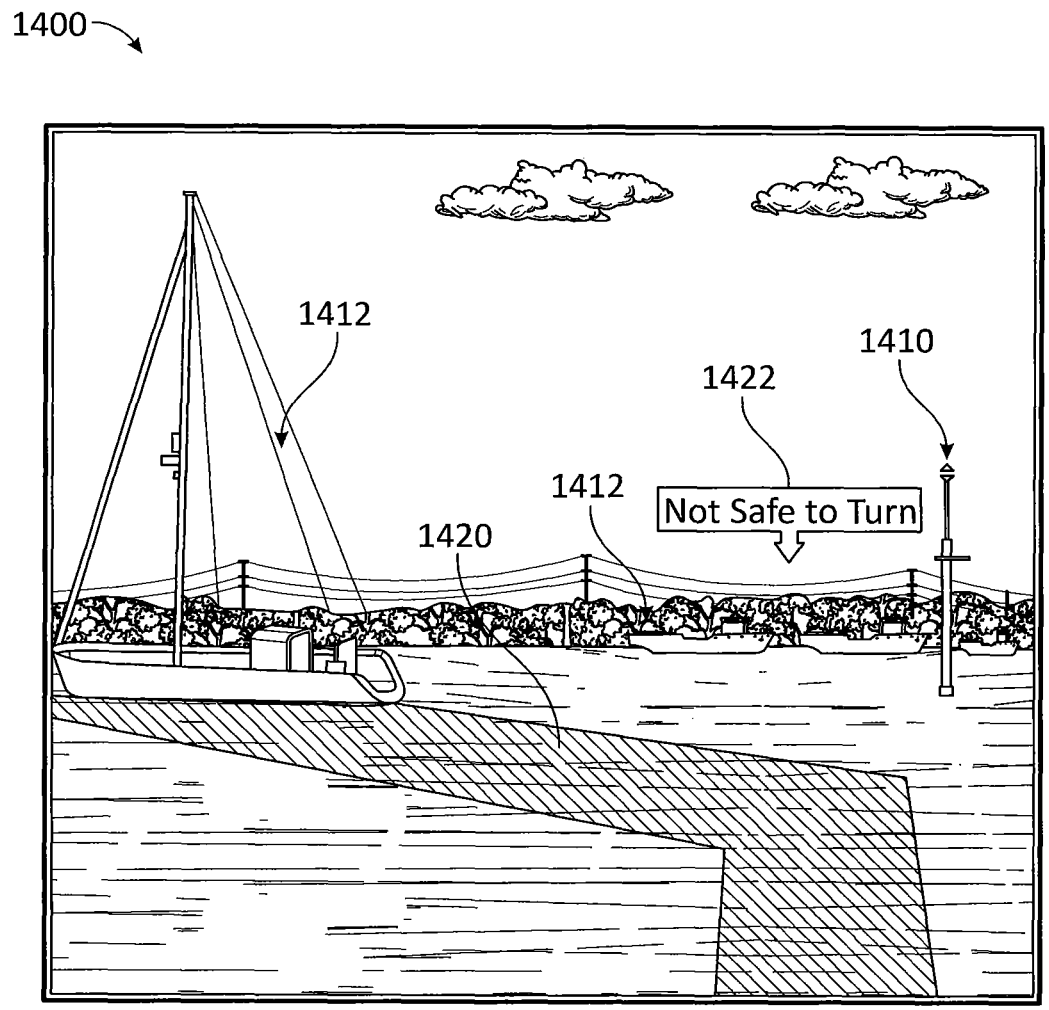
FIGS. 14A-C show AR display views for a mobile structure with a passage planning system in accordance with an embodiment of the disclosure.
Figure 14B:
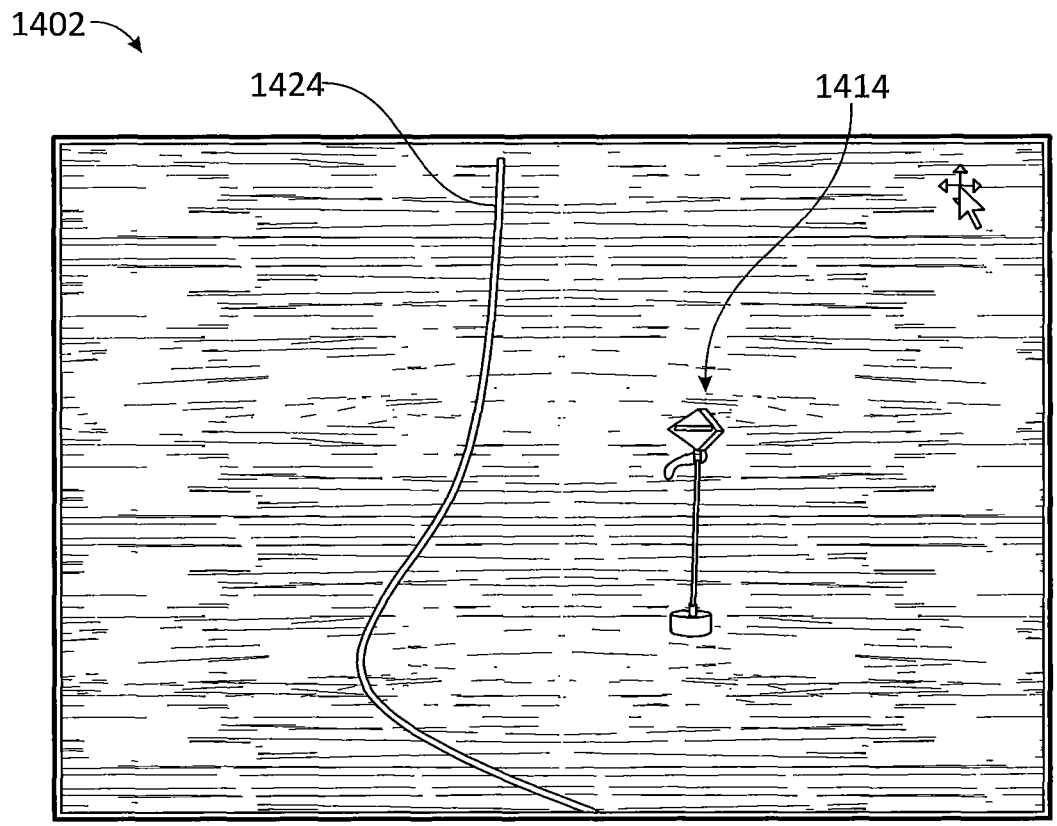
Figure 14C:
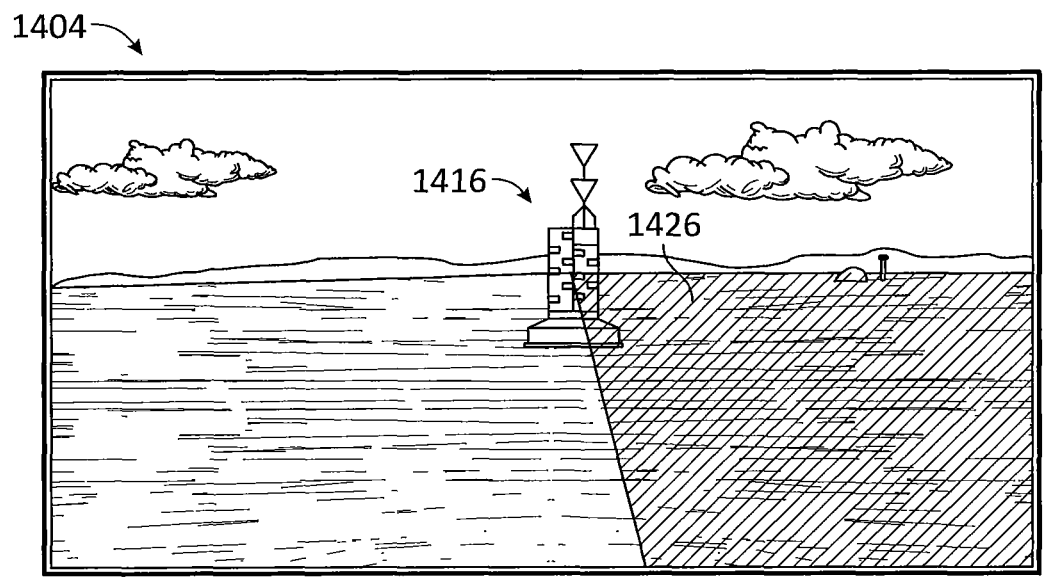

For example, FIGS. 14A-C show AR display views 1400, 1402, 1404 for mobile structure 101 with passage planning system 100 in accordance with an embodiment of the disclosure. In FIG. 14A, AR display view 1400 includes planned route indicator 1420 and navigation alert 1422 providing navigation information related to buoy 1410 and vessels 1412. In FIG. 14B, AR display view 1402 includes planned route indicator 1424 that has been adjusted to avoid buoy 1414. In FIG. 14C, AR display view 14C includes navigation alert/shallows indicator 1426 to indicate which side of channel buoy 1416 is not safely navigable.

In general, system 100 may be configured to generate the various AR display views and safety mechanisms by (1) aggregating sensor data from various sensors of system 100 into a single coherent passage database that is used to describe the area surrounding mobile structure 101; (2) adding navigation requests (e.g., provided to navigation control system 190) to the passage database; (3) using an expert system (e.g., using machine learning techniques) to determine a set of potential navigation hazard contacts (e.g., collisions, groundings) based on the passage database; (4) prioritizing the set of potential navigation hazard contacts; (5) generating a set of display overlays and audible alarms for all potential navigation hazard contacts with hazard priorities above a threshold priority; (6) autopiloting mobile structure 101 to avoid the potential navigation hazard contacts with hazard priorities above the threshold priority.

For example, the sensor data may be processed by the expert system (e.g., implemented by a convolutional neural network (CNN)) to detect and classify potential navigation hazards, for example, including vessels, buoys, diver down flags, anchor inverted triangle, and/or other potential navigation hazards. The passage database may include target headings, speeds, and/or routes, true or apparent wind velocities, coarse over ground, waypoint advance requests, for example, and may also include crowd sourced navigation data provided by other vessels. The expert system (e.g., implemented within or by controller 130, for example) may be configured to determine potential navigation hazard contacts based on all detected vessel's velocities, as well as requested changes to the velocity of mobile structure 101. In some embodiments, such expert system may be configured to project other vessel's motion under the assumption that their motion is constant to first (constant velocity) or second (constant acceleration) order. In related embodiments, applicable regulatory rules (e.g., "international regulations for preventing collisions at sea 1972 (COLREGs)") may be applied to help project other vessel's motion. For example, two powered vessels heading directly towards each other should both turn to starboard and pass port to port and so have predictable evolving routes.

In various embodiments, controller 130 (e.g., the expert system) may be configured to prioritize each determined potential navigation hazard contact according to immediacy and severity. Immediacy is defined as inversely proportional to the time to reach the potential navigation hazard contact (e.g., impact in the case of collision, shallow threshold crossing, or crossing a line of channel marks, etc.). Severity is defined as proportional to risk of property damage or human injury; impact with another vessel has higher severity than entering shallow water (where grounding is not imminent). According to such strategy, rapidly approaching vessels or vessels behaving unusually may be flagged as potential navigation hazard contacts from further away, creating a higher level of severity.

The expert system may be configured to determine when to show warnings and which views to show, without the user having to intervene. Similarly, the expert system may be configured to choose display views and apps according to context (e.g., showing docking views and entering assisted docking mode when close to a dock). The highest priority potential navigation hazard contacts trigger a set of display overlays and audible alarms, and system 100 displays the highest priority potential navigation hazard contacts to the user. Alarm characteristics are chosen to reflect the severity and urgency, with increasing volume and cadence as the immediacy and severity increase. If system 100 is autopiloting mobile structure 101, after alarming for a maximum inaction period (e.g., 20s), system 100 may be configured to adjust a heading and/or speed of mobile structure 101 to avoid the potential navigation hazard contact. For example, a target heading may be adjusted, then once past a potential navigation hazard contact, restored, to route mobile structure 101 around a fishing float. The direction of turn may be selected or determined to minimize risk (collision with other vessels, shallow water, etc.).

CNNs often operate most efficiently with fixed frame sizes (e.g., 512×512), yet maritime imagery often needs lots of pixels for reliable monitoring. This means that a CNN might need to process 100s of fixed frames to process a full 360 degree maritime scene, and even then, the CNN would likely be confused by large objects (e.g., a single vessel close-up, could be larger than 512×512). Detailed (distant) objects tend to be close to the horizon, so for many maritime applications it is only necessary to process a strip just at or below the horizon to reliably detect and classify the fine pixelated far off objects. Big objects close-up can be processed by the CNN by down sampling.

Figure 15:
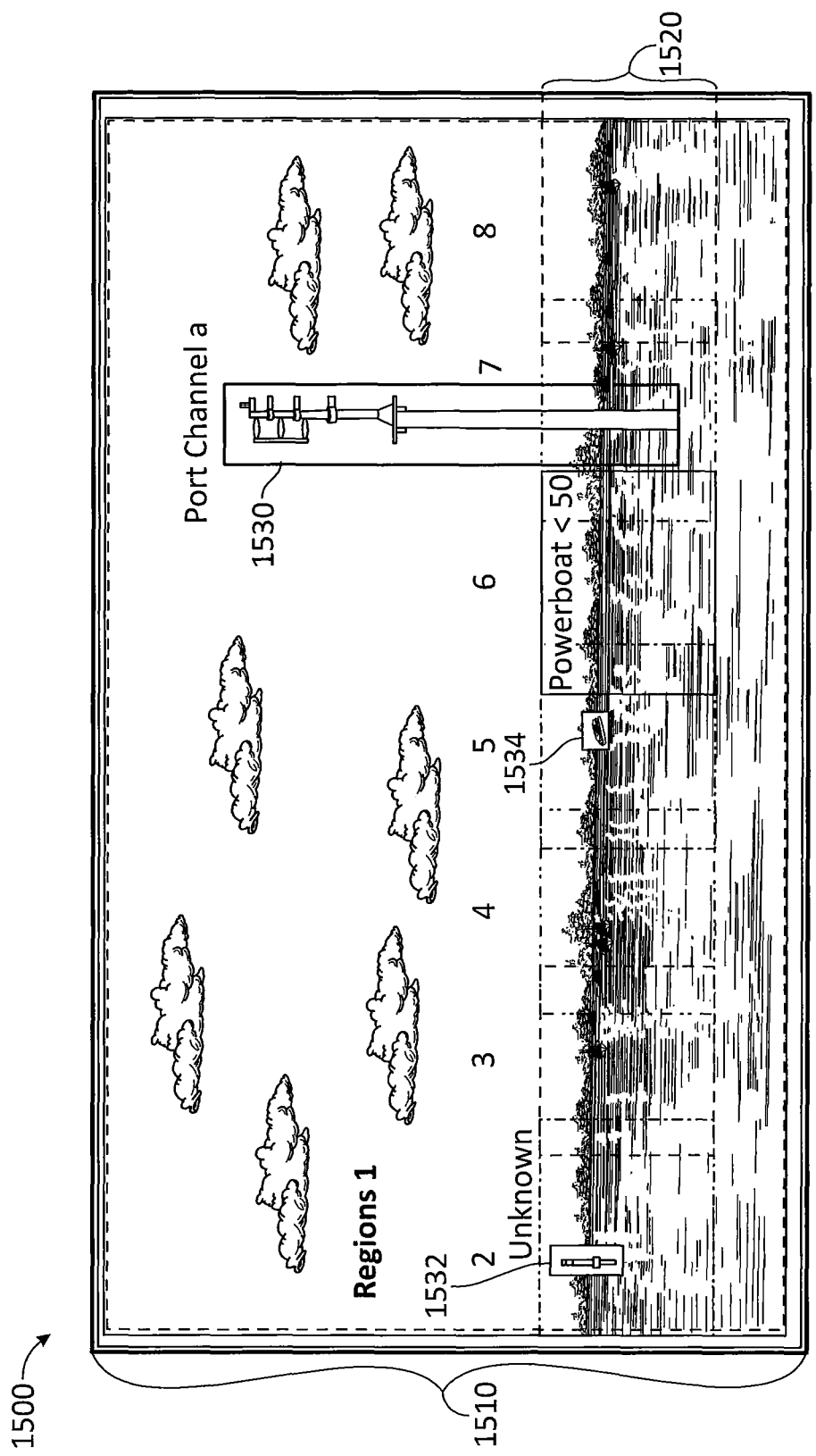
FIG. 15 shows an image processing strategy for AR display views for a mobile structure with a passage planning system in accordance with an embodiment of the disclosure.

FIG. 15 shows a region-differentiated image processing strategy 1500 for AR display views for mobile structure 101 with passage planning system 100 in accordance with an embodiment of the disclosure. For example, as shown in FIG. 15, region-differentiated image processing strategy 1500 includes a first large region 1510 that encompasses the entirety of the FOV of imaging system 1210, for example, and a number of (e.g., seven) additional smaller overlapping regions 1520 distributed across the horizon in the FOV of imaging system 1210, as shown, each being the same pixel size as the applicable CNN. In some embodiments, system 100 may be configured to downsample full frame region 1510 to a specified fixed frame size (e.g., using decimation, bicubic downsampling, etc.) associated with a CNN implemented by controller 130, for example, and the result of such processing can be detection and classification of relatively large port channel buoy 1530. System 100 may then identify and process horizon regions 1520 (e.g., using horizon/contrast detection and a desired overlap distribution), and the result of such processing can be the detection and classification of relatively small objects, such as buoy 1532 and powerboat 1534. Embodiments using image processing strategy 1500 or similar are able to significantly reduce the computing resources necessary to provide reliable object detection and classification, as described herein.

Embodiments of system 100 integrated with imaging system 1210 may be used to create a visual navigation log, for example, which could be used for insurance purposes and/or monitored by a rental company to contemporaneously analyze detected near-misses or other dangerous behavior over the rental period. Similar image processing techniques can be used to implement search and rescue systems, where feeds into the database include man over board location, vessel-in-trouble location, search area, search pattern, etc. Such imagery feed can include a live link to coastguard or border protection services or craft. Embodiments can be used to implement fishing applications, where desirable fishing spots or waypoints are included in the passage database, along with thermocline, water temperature, and/or other sensor data. Embodiments can also be used to implement sailboat racing applications, such that the passage database can include race marks, wind information (which can be visualized in 2d or 3d), live positions of competing ships, water currents, etc. Specialized racing rules can be included in the database (similar to the regulatory rules) so that system 100 indicates through an AR display view whether a pilot should give or is due water at a race mark, or if a pilot has broken a rule and must perform penalty turns.

Figure 16:
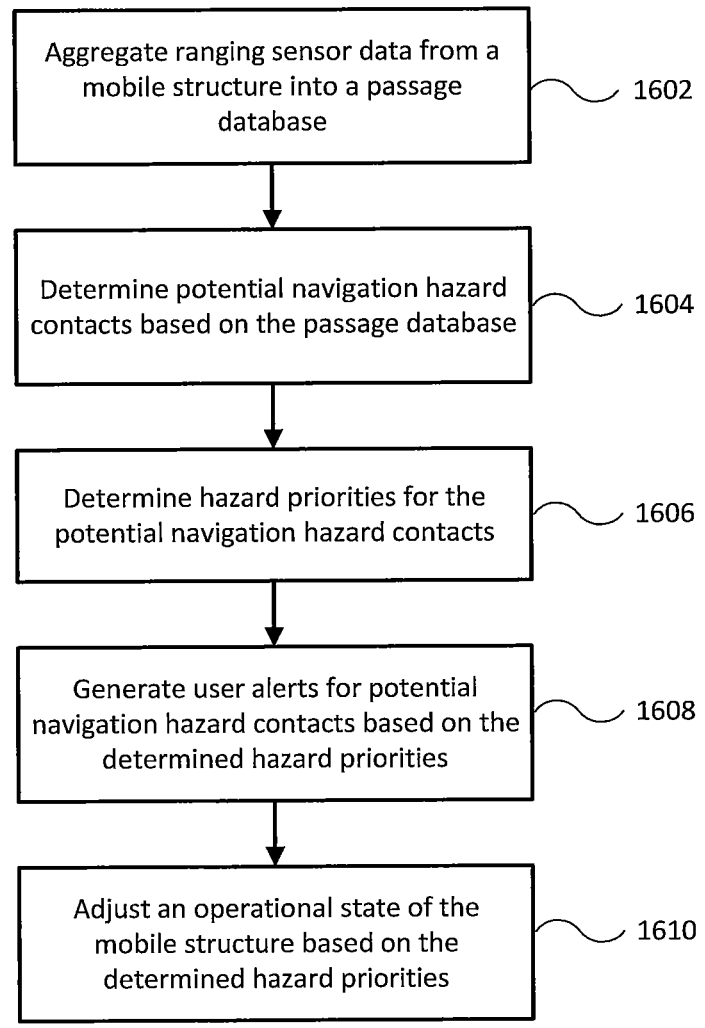
FIG. 16 illustrates a flow diagram of a process to provide AR display views for a mobile structure with a passage planning system in accordance with an embodiment of the disclosure.

FIG. 16 illustrates a flow diagram of a process 1600 to provide AR display views for mobile structure 101 in accordance with an embodiment of the disclosure. It should be appreciated that any step, sub-step, sub-process, or block of process 1600 may be performed in an order or arrangement different from the embodiments illustrated by FIG. 16. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1600 is described with reference to systems, processes, control loops, and images described in reference to FIGS. 1A-15, process 1600 may be performed by other systems different from those systems, processes, control loops, and images and including a different selection of electronic devices, sensors, assemblies, mobile structures, and/or mobile structure attributes, for example.

In block 1602, ranging sensor data from a mobile structure is aggregated into a passage database. For example, controller 130 may be configured to aggregate perimeter sensor data provided by perimeter ranging system 148 into a passage database, as described herein. In some embodiments, the passage database may include, in addition to the perimeter sensor data, a regulatory navigation ruleset (e.g., local, territorial, international), user navigation preferences (e.g., a navigation comfort mode, navigational aggressiveness, a minimum priority threshold, and/or other user navigation preferences), passage criteria associated with a planned route for the mobile structure (e.g., a planned destination, time of arrival, route, and/or a minimum SOC), and/or navigation control signals (e.g., a time series of navigation control signals) provided to navigation control system 190 of mobile structure 101 (e.g., by user interface 120 and/or controller 130).

In some embodiments, controller 130 may be configured to additionally or alternatively aggregate environmental sensor data provided by one or more environmental sensors mounted to or within mobile structure 101 into the passage database. In related embodiments, the passage database may include a fishing compendium comprising a variety of fishing-related data, such as positions of fishing locations, seasonal and species fishing catch rates, suggested baits or lures, correlations of catch rates to local time of day, weather (e.g., sun or cloud cover), sea surface temperatures, wind, tide, lunar or solar activity, and/or other environmental conditions.

In block 1604, potential navigation hazard contacts are determined. For example, controller 130 may be configured to determine a set of potential navigation hazard contacts based, at least in part, on the passage database updated in block 1602. In some embodiments, controller 130 may be configured to detect and classify one or more navigation hazards within a preselected range of mobile structure 101 (e.g., the sensing range of an associated ranging sensor system) based, at least in part, on the ranging sensor data in the passage database. Controller 130 may then identify at least one of the one or more navigation hazards as the set of potential navigation hazard contacts based, at least in part, on a projected course of mobile structure 101 (e.g., a target heading, target speed, and/or a target or planned route for mobile structure 101) and a position and/or a projected motion of the at least one navigation hazard. Such projected motion may assume a detected velocity or acceleration of the at least one navigation hazard be constant over the time period of the projection.

In some embodiments, the ranging sensor system includes imaging system 1210 implemented as an embodiment of perimeter ranging system 148. In such embodiments, controller 130 may be configured to process imagery provided by imaging system 1210 according to region-differentiated image processing strategy 1500 using a fixed frame CNN characterized by a fixed frame pixel size that is smaller than a frame pixel size of the imagery provided by the imaging system, as described herein.

In additional or alternative embodiments, where the passage database comprises a fishing compendium, controller 130 may be configured to determine a set of potential fishing locations based, at least in part, on the passage database updated in block 1602. Such set of potential fishing locations may be selected or identified within the passage database based on an achievable navigational range of mobile structure 101, for example, or desired time of arrival at a destination (e.g., to return to a berth).

In block 1606, hazard priorities for potential navigation hazard contacts are determined. For example, controller 130 may be configured to determine a set of hazard priorities corresponding to the set of potential navigation hazard contacts determined in block 1604 based, at least in part, on the passage database updated in block 1602. In some embodiments, controller 130 may be configured to determine an immediacy for each potential navigation hazard contact based, at least in part, on an estimated time for the mobile structure to reach the corresponding navigation hazard; determine a severity for each potential navigation hazard contact based, at least in part, on a size, shape, velocity, and/or type of the corresponding navigation hazard; and determine the set of hazard priorities based on a combination (e.g., sum) of the immediacy and severity for each potential navigation hazard contact in the corresponding set of potential navigation hazard contacts.

In additional or alternative embodiments, where the passage database comprises a fishing compendium, controller 130 may be configured to determine a set of fishing location priorities corresponding to the set of potential fishing locations determined in block 1604 based, at least in part, on the passage database updated in block 1602.

In block 1608, user alerts for potential navigation hazard contacts are generated. For example, controller 130 may be configured to generate a user alert for each potential navigation hazard contact, based, at least in pail, on its corresponding priority and a preselected minimum priority threshold. In some embodiments, when generating a user alert, controller 130 may be configured to render a navigation alert identifying one or more potential navigation hazard contacts with corresponding hazard priorities above the preselected minimum priority threshold on a display of user interface 120 associated with mobile structure 101. In other embodiments, controller 130 may be configured to generate an audible alert via a speaker of user interface 120 for at least one of the one or more potential navigation hazard contacts with corresponding hazard priorities above the preselected minimum priority threshold.

In additional or alternative embodiments, where the passage database comprises a fishing compendium, controller 130 may be configured to render navigation information or identifiers identifying one or more potential fishing locations with corresponding fishing location priorities above a preselected minimum fishing priority threshold on a display of user interface 120 associated with mobile structure 120. Controller 130 may also be configured to generate an audible alert via a speaker of user interface 120 for at least one of the one or more potential fishing locations with corresponding fishing location priorities above the preselected minimum fishing priority threshold.

In block 1610, an operational state of a mobile structure is adjusted. For example, controller 130 may be configured to adjust, using operational state controller coupled to or within mobile structure 101 (e.g., an embodiment of controller 130), the operational state of mobile structure 101 based, at least in part, on the set of potential navigation hazard contacts determined in block 1604, the corresponding set of hazard priorities determined in block 1606, and a preselected minimum priority threshold. In some embodiments, such operational state of mobile structure 101 may include a target heading, speed, and/or route for mobile structure 101, and controller 130 may be configured to adjust the operational state of mobile structure 101 by adjusting the target heading, speed, and/or route for mobile structure 101 to avoid one or more potential navigation hazard contacts with corresponding hazard priorities above the preselected minimum priority threshold.

In additional or alternative embodiments, where the passage database comprises a fishing compendium, controller 130 may be configured to adjust a target heading, speed, and/or route for mobile structure 101 to navigate to one or more potential fishing spots with corresponding fishing location priorities above a preselected minimum fishing priority threshold.

Embodiments of the present disclosure can thus provide reliable and accurate AR display views for mobile structures and/or passage planning systems. Such embodiments may be used to assist in the operation of various systems, devices, and/or sensors coupled to or associated with mobile structure 101, such as navigation control system 190 in FIG. 1A, as described herein. Moreover, such embodiments may be employed to reliably and accurately provide situational awareness and collision detection and avoidance, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
receiving propulsion mode data as user input provided to a user interface, the propulsion mode data specifying user selection for at least one of:
  (i) power to be used for at least one propulsion power source relative to a full power of the at least one propulsion power source;
  (ii) whether to use at least one generator of power provided to at least one motor for propulsion;
  (iii) whether to use one or more specific propulsion power sources;
  (iv) amount of draw of accessory power from a power source supplying both accessory power and propulsion power;
determining an operational state of a mobile structure based, at least in part, on operational state data provided by at least one operational state sensor mounted to or within the mobile structure;
determining environmental conditions associated with the mobile structure; and
determining an operational range map associated with the mobile structure based, at least in part, on the propulsion mode data, the operational state of the mobile structure and the environmental conditions associated with the mobile structure, wherein determining the operational range map comprises determining a set of straight line range estimations from an initiation position of the mobile structure provided by the position sensor;
wherein each straight line range estimation is based, at least in part, on a series of predicted speeds of the mobile structure along each straight line range estimation; and
wherein each predicted speed is based, at least in part, on the operational state of the mobile structure and a true or apparent wind polar associated with the mobile structure.

2. The method of claim 1, wherein the propulsion mode data specifies user selection (i), and the method further comprises:
determining passage criteria associated with a planned route for the mobile structure, wherein the determining the operational range map is based, at least in part, on the passage criteria; and wherein the determining the passage criteria comprises:
receiving a first portion of the passage criteria as user input provided to the user interface, wherein the first portion of the passage criteria comprises a destination and a desired arrival time; and
determining a second portion of the passage criteria based, at least in part, on the first portion of the passage criteria and the operational state of the mobile structure, wherein the second portion of the passage criteria comprises a series of waypoints defining the planned route and a corresponding series of mechanical propulsion power levels to be provided by a main battery of the mobile structure to a propulsion system of the mobile structure.

3. The method of claim 1, wherein:
the propulsion mode data specifies user selection (ii);
the operational state comprises an electric propulsion state, a heading, and/or a position of the mobile structure;
the environmental conditions comprise a wind velocity and/or a current velocity associated with the mobile structure and/or a planned route for the mobile structure; and
wherein the determining the environmental conditions comprises:
receiving environmental sensor data, position data, and/or orientation data from corresponding sensors mounted to the mobile structure; and/or
determining a wind velocity and/or a current velocity associated with the mobile structure based on the environmental sensor data, the position data, and/or the orientation data.

4. The method of claim 1, wherein the propulsion mode data specifies user selection (iii), and the method further comprises:
rendering the operational range map over a navigational chart rendered on the display of the user interface; and
adjusting, using an operational state controller coupled to or within the mobile structure, the operational state of the mobile structure based, at least in part, on the operational range map and/or passage criteria associated with a planned route for the mobile structure;
wherein the operational state of the mobile structure comprises a main battery charge level for a main battery of a propulsion system for the mobile structure; and
the adjusting the operational state of the mobile structure comprises adjusting a mechanical propulsion power provided by the main battery to the propulsion system.

5. The method of claim 1, wherein the propulsion mode data specifies user selection (iv).

6. The method of claim 1, further comprising:
aggregating ranging sensor data provided by a ranging sensor system mounted to the mobile structure into a passage database;
determining a set of potential navigation hazard contacts based, at least in part, on the passage database; and
determining a set of hazard priorities corresponding to the set of potential navigation hazard contacts based, at least in part, on the passage database;
wherein:
the propulsion mode data specifies user selection of whether to use a sail;
the passage database comprises the ranging sensor data and a regulatory navigation ruleset, user navigation preferences, passage criteria associated with a planned route for the mobile structure, and/or navigation control signals provided to a navigation control system of the mobile structure; and
wherein the determining the set of potential navigation hazard contacts comprises:
detecting and classifying one or more navigation hazards within a preselected range of the mobile structure based, at least in part, on the passage database; and
identifying at least one of the one or more navigation hazards as the set of potential navigation hazard contacts based, at least in part, on a projected course of the mobile structure and a position and/or a projected motion of the at least one navigation hazard.

7. The method of claim 1, further comprising:
aggregating ranging sensor data provided by a ranging sensor system mounted to the mobile structure into a passage database;
determining a set of potential navigation hazard contacts based, at least in part, on the passage database; and determining a set of hazard priorities corresponding to the set of potential navigation hazard contacts based, at least in part, on the passage database;
wherein the ranging sensor system comprises an imaging system implemented as a perimeter ranging system for the mobile structure, and wherein the determining the set of potential navigation hazard contacts comprises:
processing imagery provided by the imaging system according to a region-differentiated image processing strategy using a fixed frame convolutional neural network (CNN) characterized by a fixed frame pixel size that is smaller than a frame pixel size of the imagery provided by the imaging system.

8. The method of claim 1, further comprising:
aggregating ranging sensor data provided by a ranging sensor system mounted to the mobile structure into a passage database;
determining a set of potential navigation hazard contacts based, at least in part, on the passage database; and
determining a set of hazard priorities corresponding to the set of potential navigation hazard contacts based, at least in part, on the passage database;
wherein the determining the set of hazard priorities comprises:
determining an immediacy for each potential navigation hazard contact based, at least in part, on an estimated time for the mobile structure to reach the corresponding navigation hazard;
determining a severity for each potential navigation hazard contact based, at least in part, on a size, shape, velocity, and/or type of the corresponding navigation hazard;
determining the set of hazard priorities based on a combination of the immediacy and severity for each potential navigation hazard contact in the corresponding set of potential navigation hazard contacts; and
generating a user alert for each potential navigation hazard contact based, at least in part, on its corresponding priority and a preselected minimum priority threshold, wherein the generating the user alert comprises:
rendering a navigation alert identifying one or more potential navigation hazard contacts with corresponding hazard priorities above the preselected minimum priority threshold on a display of the user interface associated with the mobile structure; and/or
generating an audible alert via a speaker of the user interface for at least one of the one or more potential navigation hazard contacts with corresponding hazard priorities above the preselected minimum priority threshold.

9. The method of claim 1, further comprising:
aggregating ranging sensor data provided by a ranging sensor system mounted to the mobile structure into a passage database;
determining a set of potential navigation hazard contacts based, at least in part, on the passage database; and
determining a set of hazard priorities corresponding to the set of potential navigation hazard contacts based, at least in part, on the passage database;
adjusting, using an operational state controller coupled to or within the mobile structure, the operational state of the mobile structure based, at least in part, on the set of potential navigation hazard contacts, the corresponding set of hazard priorities, and a preselected minimum priority threshold, wherein the operational state of the mobile structure comprises a target heading, speed, and/or route for the mobile structure; and
the adjusting the operational state of the mobile structure comprises adjusting the target heading, speed, and/or route for the mobile structure to avoid one or more potential navigation hazard contacts with corresponding hazard priorities above the preselected minimum priority threshold; and
wherein the passage database comprises a fishing compendium, the method further comprising:
aggregating environmental sensor data provided by one or more environmental sensors mounted to or within the mobile structure into the passage database;
determining a set of potential fishing locations based, at least in part, on the passage database; and
determining a set of fishing location priorities corresponding to the set of potential fishing locations based, at least in part, on the passage database.

10. A system comprising:
a user interface associated with a mobile structure, wherein the user interface comprises a display;
a logic device configured to communicate with the user interface, a ranging sensor system mounted to the mobile structure, and at least one operational state sensor mounted to or within the mobile structure, wherein the logic device is configured to:
receive propulsion mode data as user input provided to user interface, the propulsion mode data specifying user selection for at least one of:
(i) power to be used for at least one propulsion power source relative to a full power of the at least one propulsion power source;
(ii) whether to use at least one generator of power provided to at least one motor for propulsion;
(iii) whether to use one or more specific propulsion power sources;
(iv) amount of draw of accessory power from a power source supplying both accessory power and propulsion power;
aggregate ranging sensor data provided by the ranging sensor system into a passage database;
determine an operational state of the mobile structure based, at least in part, on operational state data provided by the at least one operational state sensor;
determine environmental conditions associated with the mobile structure; and
determine an operational range map associated with the mobile structure based, at least in part, on the propulsion mode data, the operational state of the mobile structure and the environmental conditions associated with the mobile structure;
determine a set of potential navigation hazard contacts based, at least in part, on the passage database; and
determine a set of hazard priorities corresponding to the set of potential navigation hazard contacts based, at least in part, on the passage database;
wherein:
the ranging sensor system comprises an imaging system implemented as a perimeter ranging system for the mobile structure, and wherein the determining the set of Potential navigation hazard contacts comprises:
processing imagery provided by the imaging system according to a region-differentiated image processing strategy using a fixed frame convolutional neural network (CNN) characterized by a fixed frame pixel size that is smaller than a frame pixel size of the imagery provided by the imaging system.

11. The system of claim 10, wherein the propulsion mode data specifies user selection (i), and the logic device is configured to:
- determine passage criteria associated with a planned route for the mobile structure, wherein the determining the operational range map is based, at least in part, on the passage criteria; and
- wherein the determining the passage criteria comprises:
- receiving a first portion of the passage criteria as user input provided to the user interface, wherein the first portion of the passage criteria comprises a destination and a desired arrival time; and
- determining a second portion of the passage criteria based, at least in part, on the first portion of the passage criteria and the operational state of the mobile structure, wherein the second portion of the passage criteria comprises a series of waypoints defining the planned route and a corresponding series of mechanical propulsion power levels to be provided by a main battery of the mobile structure to a propulsion system of the mobile structure.

12. The system of claim 10, wherein:
- the propulsion mode data specifies user selection (ii);
- the operational state comprises an electric propulsion state, a heading, and/or a position of the mobile structure;
- the environmental conditions comprise a wind velocity and/or a current velocity associated with the mobile structure and/or a planned route for the mobile structure; and
- wherein the determining the environmental conditions comprises:
- receiving environmental sensor data, position data, and/or orientation data from corresponding sensors mounted to the mobile structure; and/or
- determining a wind velocity and/or a current velocity associated with the mobile structure based on the environmental sensor data, the position data, and/or the orientation data.

13. The system of claim 10, wherein the propulsion mode data specifies user selection (iii), and the logic device is configured to:
- render the operational range map over a navigational chart rendered on the display of the user interface; and
- further comprising an operational state controller coupled to or within the mobile structure, wherein the logic device is configured to:
- adjust, using the operational state controller, the operational state of the mobile structure based, at least in part, on the operational range map and/or passage criteria associated with a planned route for the mobile structure, wherein:
- the operational state of the mobile structure comprises a main battery charge level for a main battery of a propulsion system for the mobile structure; and
- the adjusting the operational state of the mobile structure comprises adjusting a mechanical propulsion power provided by the main battery to the propulsion system.

14. The system of claim 10, wherein the propulsion mode data specifies user selection (iv).

15. The system of claim 10, wherein:
- the logic device is configured to communicate with a ranging sensor system mounted to the mobile structure, and wherein the logic device is configured to:
- aggregate ranging sensor data provided by the ranging sensor system into a passage database;
- determine a set of potential navigation hazard contacts based, at least in part, on the passage database; and
- determine a set of hazard priorities corresponding to the set of potential navigation hazard contacts based, at least in part, on the passage database;
- wherein:
- the propulsion mode data specifies user selection of whether to use a sail;
- the passage database comprises the ranging sensor data and a regulatory navigation ruleset, user navigation preferences, passage criteria associated with a planned route for the mobile structure, and/or navigation control signals provided to a navigation control system of the mobile structure; and
- wherein the determining the set of potential navigation hazard contacts comprises:
- detecting and classifying one or more navigation hazards within a preselected range of the mobile structure based, at least in part, on the passage database; and
- identifying at least one of the one or more navigation hazards as the set of potential navigation hazard contacts based, at least in part, on a projected course of the mobile structure and a position and/or a projected motion of the at least one navigation hazard.

16. The system of claim 10, wherein:
- the logic device is configured to communicate with a ranging sensor system mounted to the mobile structure, and wherein the logic device is configured to:
- aggregate ranging sensor data provided by the ranging sensor system into a passage database;
- determine a set of potential navigation hazard contacts based, at least in part, on the passage database; and
- determine a set of hazard priorities corresponding to the set of potential navigation hazard contacts based, at least in part, on the passage database;
- wherein:
- the determining the set of hazard priorities comprises:
- determining an immediacy for each potential navigation hazard contact based, at least in part, on an estimated time for the mobile structure to reach the corresponding navigation hazard;
- determining a severity for each potential navigation hazard contact based, at least in part, on a size, shape, velocity, and/or type of the corresponding navigation hazard;
- determining the set of hazard priorities based on a combination of the immediacy and severity for each potential navigation hazard contact in the corresponding set of potential navigation hazard contacts; and
- generate a user alert for each potential navigation hazard contact based, at least in part, on its corresponding priority and a preselected minimum priority threshold, wherein the generating the user alert comprises:
- rendering a navigation alert identifying one or more potential navigation hazard contacts with corresponding hazard priorities above the preselected minimum priority threshold on a display of the user interface associated with the mobile structure; and/or
- generating an audible alert via a speaker of the user interface for at least one of the one or more potential navigation hazard contacts with corresponding hazard priorities above the preselected minimum priority threshold.

17. The system of claim 10, wherein:
- the logic device is configured to communicate with a ranging sensor system mounted to the mobile structure, and wherein the logic device is configured to:

aggregate ranging sensor data provided by the ranging sensor system into a passage database;
determine a set of potential navigation hazard contacts based, at least in part, on the passage database; and
determine a set of hazard priorities corresponding to the set of potential navigation hazard contacts based, at least in part, on the passage database;
wherein the system further comprises an operational state controller coupled to or within the mobile structure, wherein the logic device is configured to:
adjust, using the operational state controller, the operational state of the mobile structure based, at least in part, on the set of potential navigation hazard contacts, the corresponding set of hazard priorities, and a preselected minimum priority threshold;
wherein the operational state of the mobile structure comprises a target heading, speed, and/or route for the mobile structure; and
the adjusting the operational state of the mobile structure comprises adjusting the target heading, speed, and/or route for the mobile structure to avoid one or more potential navigation hazard contacts with corresponding hazard priorities above the preselected minimum priority threshold; and
wherein the system further comprises one or more environmental sensors mounted to or within the mobile structure, wherein the passage database comprises a fishing compendium, and wherein the logic device is configured to:
aggregate environmental sensor data provided by the one or more environmental sensors into the passage database;
determine a set of potential fishing locations based, at least in part, on the passage database; and
determine a set of fishing location priorities corresponding to the set of potential fishing locations based, at least in part, on the passage database.

18. A system comprising:
a user interface associated with a mobile structure, wherein the user interface comprises a display;
a logic device configured to communicate with the user interface and at least one operational state sensor mounted to or within the mobile structure, wherein the logic device is configured to:
determine an operational state of the mobile structure based, at least in part, on operational state data provided by the at least one operational state sensor;
determine environmental conditions associated with the mobile structure; and
determine an operational range map associated with the mobile structure based, at least in part, on the operational state of the mobile structure and the environmental conditions associated with the mobile structure;
wherein the system comprises a position sensor mounted to the mobile structure, wherein:
the determining the operational range map comprises determining a set of straight line range estimations from an initiation position of the mobile structure provided by the position sensor;
each straight line range estimation is based, at least in part, on a series of predicted speeds of the mobile structure along each straight line range estimation; and
each predicted speed is based, at least in part, on the operational state of the mobile structure and a true or apparent wind polar associated with the mobile structure.

19. The system of claim 18, wherein:
the propulsion mode data specifies user selection (i), and the logic device is configured to:
determine passage criteria associated with a planned route for the mobile structure, wherein the determining the operational range map is based, at least in part, on the passage criteria, and wherein the determining the passage criteria comprises:
receiving a first portion of the passage criteria as user input provided to the user interface, wherein the first portion of the passage criteria comprises a destination and a desired arrival time; and
determining a second portion of the passage criteria based, at least in part, on the first portion of the passage criteria and the operational state of the mobile structure, wherein the second portion of the passage criteria comprises a series of waypoints defining the planned route and a corresponding series of mechanical propulsion power levels to be provided by a main battery of the mobile structure to a propulsion system of the mobile structure; or
the propulsion mode data specifies user selection (iii), and the logic device is configured to:
render the operational range map over a navigational chart rendered on the display of the user interface; and
further comprising an operational state controller coupled to or within the mobile structure, wherein the logic device is configured to:
adjust, using the operational state controller, the operational state of the mobile structure based, at least in part, on the operational range map and/or passage criteria associated with a planned route for the mobile structure, wherein:
the operational state of the mobile structure comprises a main battery charge level for a main battery of a propulsion system for the mobile structure; and
the adjusting the operational state of the mobile structure comprises adjusting a mechanical propulsion power provided by the main battery to the propulsion system.

20. The system of claim 18, wherein the logic device is further configured to:
aggregate ranging sensor data provided by a ranging sensor system mounted to the mobile structure into a passage database;
determine a set of potential navigation hazard contacts based, at least in part, on the passage database;
determine a set of hazard priorities corresponding to the set of potential navigation hazard contacts based, at least in part, on the passage database, wherein the determining the set of hazard priorities comprises:
determining an immediacy for each potential navigation hazard contact based, at least in part, on an estimated time for the mobile structure to reach the corresponding navigation hazard;
determining a severity for each potential navigation hazard contact based, at least in part, on a size, shape, velocity, and/or type of the corresponding navigation hazard;
determining the set of hazard priorities based on a combination of the immediacy and severity for each potential navigation hazard contact in the corresponding set of potential navigation hazard contacts; and generating a user alert for each potential navigation hazard contact based, at least in part, on its corresponding priority and a preselected minimum priority threshold, wherein the generating the user alert comprises:
   rendering a navigation alert identifying one or more potential navigation hazard contacts with corresponding hazard priorities above the preselected minimum priority threshold on a display of the user interface associated with the mobile structure; and/or
   generating an audible alert via a speaker of the user interface for at least one of the one or more potential navigation hazard contacts with corresponding hazard priorities above the preselected minimum priority threshold.

\* \* \* \* \*

UNITED STATES PATENT AND TRADEMARK OFFICE
CERTIFICATE OF CORRECTION

| | | |
|---|---|---|
| PATENT NO. | : 12,013,243 B2 | Page 1 of 1 |
| APPLICATION NO. | : 17/601041 | |
| DATED | : June 18, 2024 | |
| INVENTOR(S) | : Mark Johnson et al. | |

It is certified that error appears in the above-identified patent and that said Letters Patent is hereby corrected as shown below:

In the Specification

In the Detailed Description:

Column 10, Lines 52-53, change "diagram of a steering sensor actuator" to --diagram of a steering sensor/actuator--

Column 10, Line 55, change "rear portion 1010" to --rear portion 101C--

Column 21, Line 9, change "U.S. patent application Ser. No." to --U.S. Patent Application No.--

Column 31, Line 42, change "at least in pail" to --at least in part--

In the Claims

Claim 10, Column 36, Line 59, change "Potential navigation hazard" to --potential navigation hazard--

Signed and Sealed this
Thirteenth Day of August, 2024

Katherine Kelly Vidal
*Director of the United States Patent and Trademark Office*